US005875229A

United States Patent [19]
Eyuboglu et al.

[11] Patent Number: 5,875,229
[45] Date of Patent: Feb. 23, 1999

[54] SYSTEM AND DEVICE FOR, AND METHOD OF, DETECTING, CHARACTERIZING, AND MITIGATING DETERMINISTIC DISTORTION IN A COMMUNICATIONS NETWORK

[75] Inventors: M. Vedat Eyuboglu, Concord; Arthur J. Barabell, Natick, both of Mass.; Pierre A. Humblet, Cannes, France

[73] Assignee: Motorola Inc., Schaumburg, Ill.

[21] Appl. No.: 730,433

[22] Filed: Oct. 15, 1996

[51] Int. Cl.[6] .............................. H04M 1/24; H04M 3/08; H04M 3/22

[52] U.S. Cl. ................................ 379/1; 379/6; 379/12; 375/216; 375/222; 375/223

[58] Field of Search ................................ 375/216, 286, 375/222, 295, 261, 285, 223, 227, 358; 379/1, 15, 6, 9, 10, 12, 14, 23, 24, 27, 28–30, 32

[56] References Cited

U.S. PATENT DOCUMENTS

| | | | |
|---|---|---|---|
| 4,890,303 | 12/1989 | Bader | 375/353 |
| 5,040,191 | 8/1991 | Forney, Jr. et al. | |
| 5,394,437 | 2/1995 | Ayanoglu et al. | 375/222 |
| 5,490,199 | 2/1996 | Fuller et al. | 379/1 |
| 5,528,625 | 6/1996 | Ayanoglu et al. | 375/222 |

FOREIGN PATENT DOCUMENTS

| | | |
|---|---|---|
| PCT/US95/ 15924 | 6/1996 | WIPO . |

OTHER PUBLICATIONS

Rockwell International, 56 Kbps Communications Across the PSTN, 1996, Internet URL, http://www.nb.rockwell.com/nr/modemsys/.

Kalet, I.; Mazo, J.E.; Saltzberg, B.R.; The Capacity of PCM Voiceband Channels, 1993, IEEE 0–7803–0950–2/93, pp. 507–511.

Forney, G.D. Jr.; Calderbank, A.R.; Coset Codes for Partial Response Channels; or, Coset Codes with Spectral Nulls, Sep. 1989, IEEE Trans. Information Theory, vol. IT–35, pp. 925–943.

Calderbank, A.R.; Lee, T.A.; Mazo, J.E.; Baseband Trellis Codes with a Spectral Null at Zero, IEEE Trans. Information Theory, vol. IT–34, pp. 425–434, 1988.

Calderbank, A.R.; Mazo, J.E.; Baseband line codes via spectral factorization, IEEE J. Select. Areas Commun., vol. SAC–7, pp. 914–928, 1989.

Forney, G.D. Jr.; Eyuboglu, M.V.; Combined Equalization and Coding Using Precoding, IEEE Communications Magazine, vol. 29, No. 12, pp. 25–34, Dec. 1991.

Eyuboglu, M.V.; Forney, G.D. Jr.; Trellis Precoding: Combined Coding, Precoding and Shaping for Intersymbol Interference Channels, IEEE Trans. Information Theory, vol. 38, pp. 301–314, Mar. 1992.

*Primary Examiner*—Curtis A. Kuntz
*Assistant Examiner*—Binh K. Tieu
*Attorney, Agent, or Firm*—Jeffrey T. Klayman

[57] ABSTRACT

A system and device for, and method of, detecting, characterizing, and mitigating deterministic distortion in a communication system. An exemplary communication system includes a digital adaptor for sending octets on to a backbone of a PSTN, which then sends, and potentially distorts the octets, received by a line interface. The line interface converts the octets to baseband signals received by an analog adaptor. Several mechanisms and methods are described in which the analog and digital adaptor cooperate to detect the presence of distortion, in particular, robbed bit signaling, on the communication system. The characterization may then be used to mitigate the effects of the distortion. Several receive constellations are provided, each constructed in view of the transmit constellation and in view of the manner in which the deterministic distortion will distort signals transmitted over the system. The receive constellations differ from the transmit constellation. The analog adaptor uses an appropriate receive constellation based on the type of distortion expected at a given interval. The digital adaptor may similarly include several constellation in view of the same considerations.

19 Claims, 11 Drawing Sheets

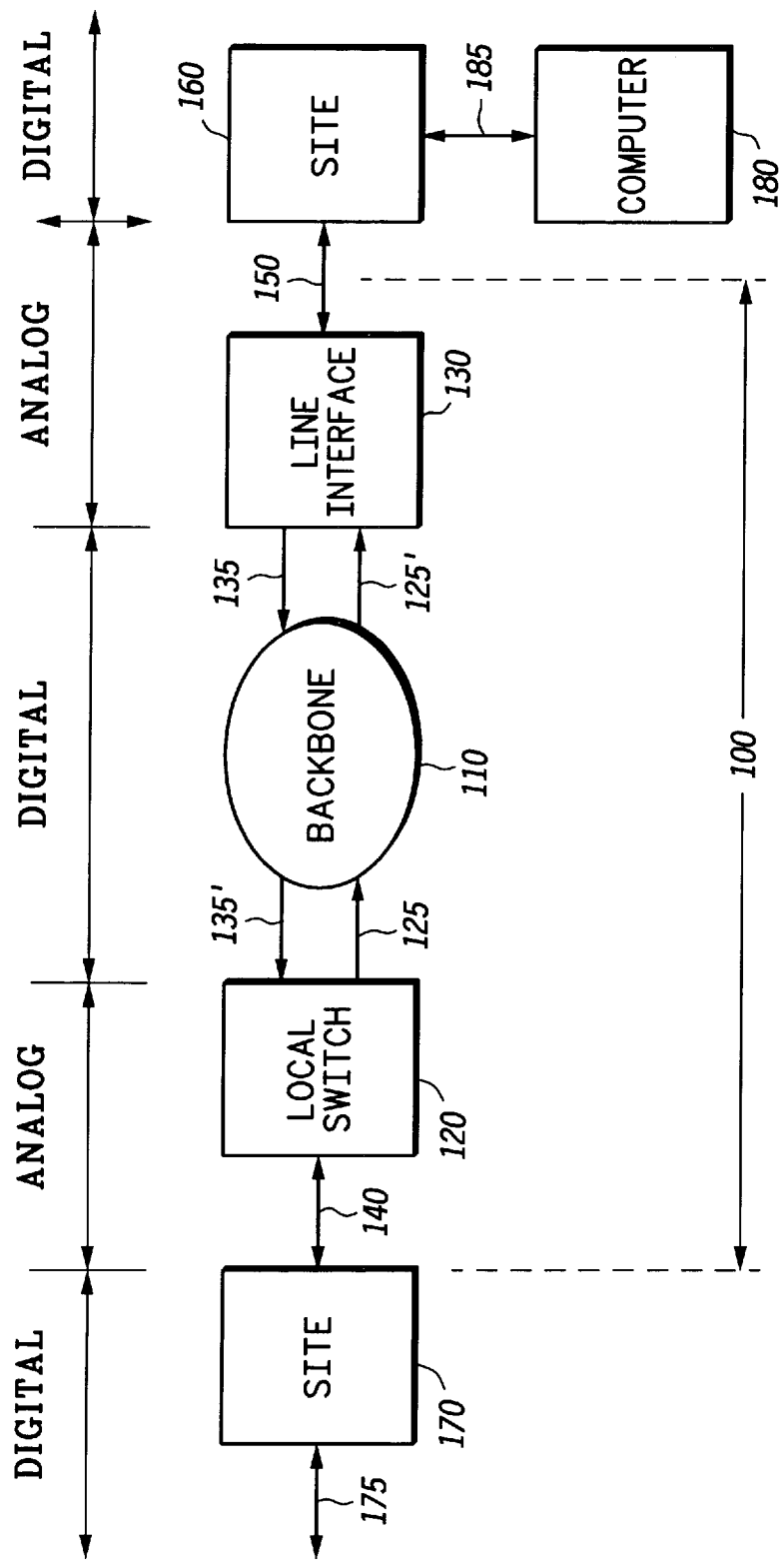
FIG.1 -PRIOR ART-

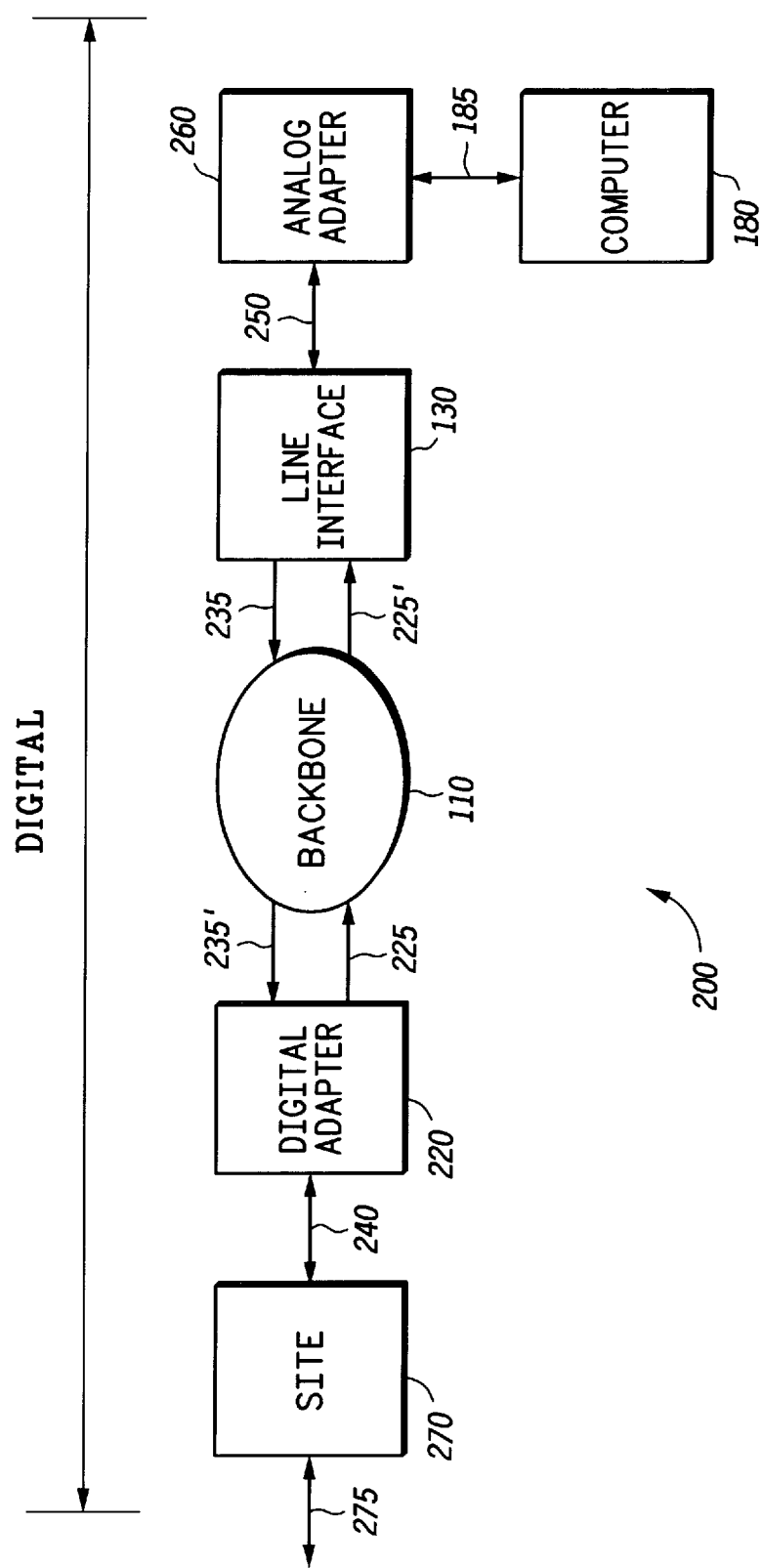

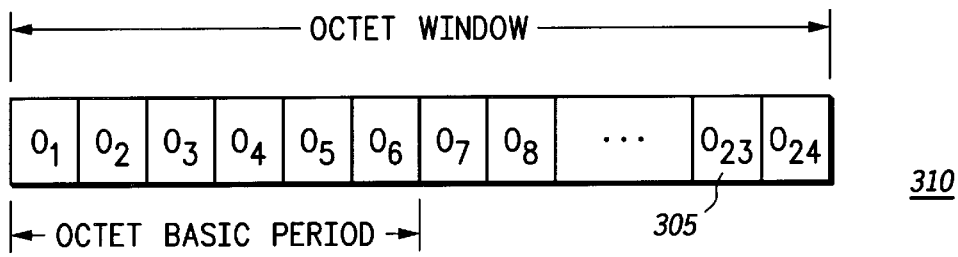
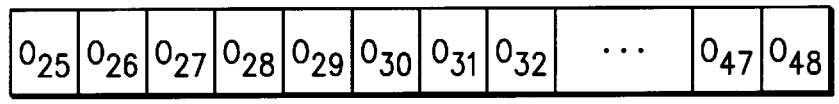
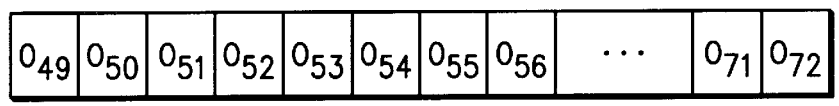
FIG.3A
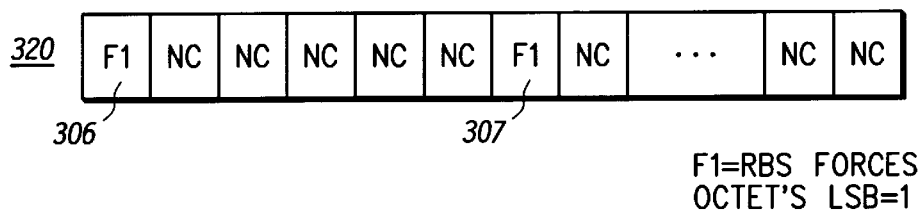
F1=RBS FORCES OCTET'S LSB=1
FIG.3B
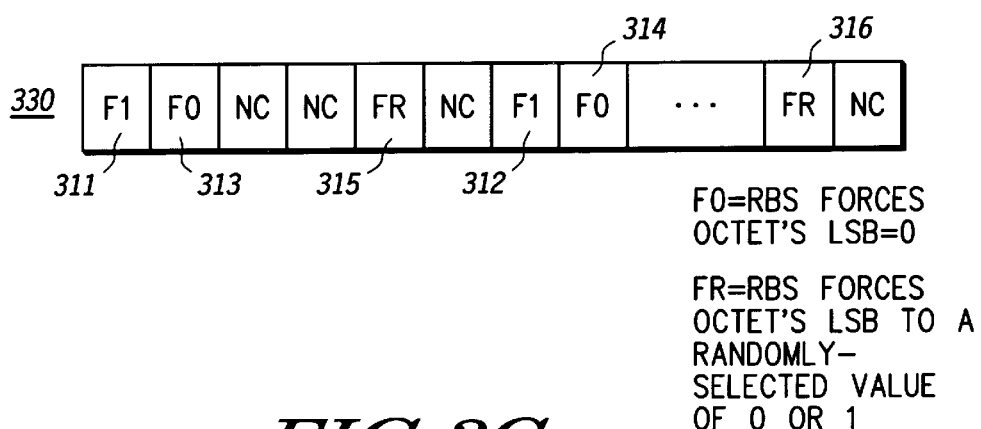
FO=RBS FORCES OCTET'S LSB=0
FR=RBS FORCES OCTET'S LSB TO A RANDOMLY-SELECTED VALUE OF 0 OR 1
FIG.3C

SYSTEM AND DEVICE FOR, AND METHOD OF, DETECTING, CHARACTERIZING, AND MITIGATING DETERMINISTIC DISTORTION IN A COMMUNICATIONS NETWORK

CROSS-REFERENCE TO RELATED APPLICATIONS

This application is related to the following U.S. applications, all of which are owned by the same assignee as the assignee of this application and all of which are incorporated by reference in their entirety:

Device, System and Method for Spectrally Shaping Transmitted Data Signals, to Vedat Eyuboglu and Pierre Humblet, filed on even date herewith;

Device, System and Method for Adaptive Self-Noise Cancellation for Decision-Directed Timing Recovery to Jian Yang, filed on even date herewith; and System and Device for, and Method of, Processing Baseband Signals to Combat ISI and Nonlinearities in a Communication System, to Pierre Humblet and Vedat Eyuboglu, filed on even date herewith.

BACKGROUND

Field of the Invention

The invention relates generally to communication systems and, more particularly, to high-speed end-to-end modem communications over the public switched telephone network.

Discussion of Related Art

There is an increasing demand for data communications and, in particular, for communication systems with increasingly higher transmission rates. With the advent of the Internet and multimedia, this demand is not expected to wane any time soon.

To date, the most popular form of data communications is accomplished using voiceband modems connected to local loops of a conventional public switched telephone network (PSTN). Voiceband modems are very popular largely because of their leverage of existing telephone network infrastructure. In short, a user needs to make only a relatively small investment for a modem and has to pay relatively modest line charges. To meet user demand for higher transmission rates, communication standards for voiceband modems have evolved with each generation including capabilities to support increasingly higher transmission rates.

Unfortunately, the rate of growth of the transmission rates of modems has slowed as transmission rates approach the information theoretic limits of the telephone channel. Consequently, users who want higher transmission rates are forced to use in their homes or offices alternative communication networks, such as ISDN, rather than the conventional PSTN. Though these alternative arrangements provide higher transmission rates, the equipment and line charges are high.

The backbone of the modern telephone network is a circuit-switched digital network ("backbone"). In the case of ISDN, an ISDN terminal adaptor transmission connects the home or office to a central office via an ISDN link. The data carried over the link is transmitted at 64 kb/s and may be thought of as a stream. The central office can arrange several streams to be carried over the digital backbone. In the case of PSTN, a modem sends analog signals to a local switch, or line interface, which converts the signals into a 64 kb/s bitstream using Pulse Code Modulation (PCM) and the resulting digital information is then carried across the digital backbone. The backbone is typically arranged as a "T-carrier system," which among other things specifies how various streams are arranged with other streams, routed, and controlled when carried over the backbone.

The primary impediments to high-speed digital communication over the modern PSTN are the quantization noise introduced by PCM codecs and robbed bit signaling introduced by the T-carrier systems.

There is, therefore, a need in the art for a device and system for, and method of, communicating at higher information rates over the PSTN by avoiding or reducing the effects of quantization noise and robbed bit signaling.

SUMMARY

This invention allows binary information to be transmitted over conventional telephone networks that include conventional digital backbones, line interfaces, and analog local loops at transmission rates higher than presently achievable with existing modem standards such as V.34. This is achieved by viewing the conventional network from a new perspective, in which certain sources of "noise" that limit the achievable bit rate are avoided with new processing techniques. The invention improves the system's information capacity and concomitantly achieves higher transmission rates without requiring costly infrastructure, such as ISDN lines or the like, at the user site.

The invention includes a method of, and a system and device for, detecting, characterizing, and mitigating deterministic distortion in a communication medium. One particular context for the invention is in a PSTN that uses robbed bit signaling, which distorts data carried over the PSTN.

Under the invention, a signal sequence, having known characteristics, is transmitted over the medium. A signal sequence is received from the medium, and a window of received sequence is analyzed in comparison to the known characteristics of the transmitted sequence to determine whether the medium is affecting the signals transmitted over the medium in a deterministic, characterizable manner.

Thus, the invention includes a digital adaptor and analog adaptor combination for communicating on a medium, such as the PSTN which includes a backbone network, a line interface for receiving octets from the backbone and for sending baseband signals representative of the received octets on a local loop and for receiving analog signals on the local loop and for sending octets representative of the analog signal on the backbone. The digital adaptor is couplable to the backbone and the analog adaptor is couplable to the local loop.

The analog adaptor may include first logic for causing a time varying signal to be transmitted on the local loop; and second logic for causing a constant signal to be transmitted on the local loop.

In turn, the digital adaptor comprises third logic, cooperating with the first logic, for analyzing octets received by the digital adaptor from the backbone to determine the distribution of octets having an LSB equal to zero and one; fourth logic, cooperating with the second logic, for analyzing octets received by the digital adaptor from the backbone to determine the distribution of octets having an LSB equal to zero and one; and fifth logic, cooperating with the third and the fourth logic, for characterizing an octet window, having octet intervals. Each interval is characterized as being one of affected by no robbed bit signaling, affected by robbed bit signaling that forces a least significant bit of octets in that interval to a zero, affected by robbed bit signaling that forces a least significant bit of octets in that interval to a one, and affected by robbed bit signaling that forces a least significant bit of octets in that interval to a randomly selected value from one and zero.

Alternatively, the digital adaptor may include first logic for causing an octet sequence to be transmitted on the backbone wherein the sequence includes octets that have their least significant bits vary between a zero and a one; and second logic for causing an octet sequence to be transmitted on the backbone wherein the sequence includes octets having a constant value for their least significant bit.

In the above case, the analog adaptor may include third logic, cooperating with the first logic, for analyzing baseband signals received by the analog adaptor from the local loop to determine the distribution of baseband signals caused by octets having an LSB equal to zero and one; fourth logic, cooperating with the second logic, for analyzing baseband signals received by the analog adaptor from the local loop to determine the distribution of baseband signals caused by octets having an LSB equal to zero and one; and fifth logic, cooperating with the third and the fourth logic, for characterizing an octet window, having octet intervals. Again, each interval is characterized as being one of affected by no robbed bit signaling, affected by robbed bit signaling that forces a least significant bit of octets in that interval to a zero, affected by robbed bit signaling that forces a least significant bit of octets in that interval to a one, and affected by robbed bit signaling that forces a least significant bit of octets in that interval to a randomly selected value from one and zero.

The invention includes the above adaptors in isolation as well as in combination.

Furthermore, under the invention, the effects of the distortion may be mitigated by transmitting on to the medium signals chosen from a transmit constellation; receiving from the medium the transmitted signals; and decoding the received signals in comparison to a receive constellation that differs from the transmit constellation. In which case, the receive constellation is constructed in view of the deterministic distortion. For the example of PSTN as a medium and robbed bit signaling as the distortion, the receive constellation uses a subset of the transmit constellation essentially unchanged and another subset of the transmit constellation is altered in view of the changes that robbed bit signaling will make to the various octet intervals in which data is transmitted. For certain types of robbed bit signaling, the receive constellation will include essentially the entire transmit constellation but will also include another set of signal points corresponding to the changes to the first set that will be made by the robbed bit signaling.

Thus, for example, the invention includes an analog adaptor for communicating over the PSTN, in which octets are transmitted on to the PSTN and correspond to a transmit constellation of transmit signal points. The analog adaptor is couplable to the local loop and includes one of several mechanisms, outlined above, for characterizing the PSTN to determine a type of robbed bit signaling affecting an octet interval, and the adaptor also includes logic, cooperating with the above mechanisms, for decoding received baseband signals according to a receive constellation that differs from the transmit constellation.

To further improve performance, the invention may include a digital adaptor for communicating over the PSTN, couplable to the PSTN and including one of several mechanisms, outlined above, for characterizing the PSTN to determine a type of robbed bit signaling affecting an octet interval and including logic, cooperating with the above mechanisms, for selecting a transmit constellation from a set of transmit constellations. The selected transmit constellation corresponds to the type of robbed bit signaling affecting an octet interval.

BRIEF DESCRIPTION OF THE DRAWING

In the Drawing,

FIG. 1 shows a conventional telephone system having local loops;

FIG. 2 is an architectural diagram of an exemplary embodiment of the invention;

FIGS. 3A–C is a chart illustrating exemplary octet sequences and how they may be affected by robbed bit signaling;

DETAILED DESCRIPTION

Figure 4A:
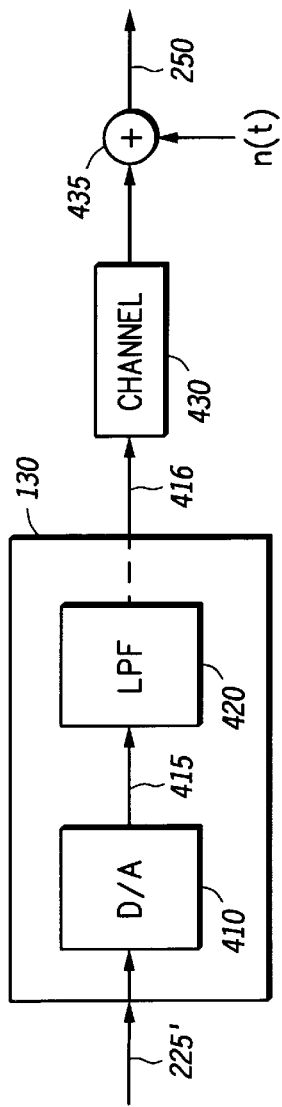
FIGS. 4A–B are architectural diagrams showing a conventional line interface, in part, a local loop, and a decoder of an exemplary embodiment of the invention.

This invention allows binary information to be transmitted over conventional telephone networks that include conventional digital backbones, line interfaces, and analog local loops at transmission rates higher than presently achievable with existing modem standards such as V.34. This is achieved by viewing the conventional network from a new perspective, in which certain sources of "noise" that limit the achievable bit rate are avoided with new processing techniques. The invention improves the system's information capacity and concomitantly achieves higher transmission rates without requiring costly infrastructure, such as ISDN lines or the like, at the user site.

To better understand the invention, certain aspects of a conventional telephone network are described. This is done to explain the various sources and forms of "noise" that limit the information capacity of a conventional arrangement and that are addressed with the invention. Afterwards, the architecture and operation of the invention are described, followed by a description of the invention's mechanisms for combating particular forms of "noise," in particular, the combination of quantization noise and robbed bit signaling (RBS).

A conventional telephone network 100 is shown in FIG. 1. What are typically interpreted as analog signals enter and exit the network 100 at "local loops" 140 and 150. Each signal on loop 140 and 150 is received by a corresponding line interface 120 and 130, or local switch, and each line interface communicates with another via a backbone digital network 110.

Under conventional operation, an information signal 175 is sent to a first site 170, which emits an analog signal, for example, representative of a voice signal or a binary information, on the local loop 140. The line interface 120 filters, samples, and quantizes the analog signal and outputs a sequence of octets 125, representative of the analog signal 140.

More specifically, the analog signal 140 is quantized according to a known set of rules, or a companding algorithm, such as µ-law or A-law, which specifies the quantization's amplitude levels among other things. The µ-law and A-law quantization rules involve unevenly-spaced quantization steps, i.e., non-uniform quantization, that were chosen to map to the inherent characteristics of speech.

The backbone 110 receives the octet sequence 125 and, though not shown, also receives octet sequences from other sources, such as other line interfaces. Using known multiplexing techniques, the backbone 110 combines octet sequences from the various sources and transmits and routes the data to various line interfaces, e.g., 130. Modern backbones transmit the individual octet sequences at a rate of 64,000 bits per second (8,000 octets per second). Eventually an octet sequence 125', which is similar but not necessarily identical to the original octet sequence 125, is transmitted to the line interface 130 corresponding to the destination site 160.

The line interface 130 essentially inverse quantizes and further processes the received octet sequence 125' to create on loop 150 an analog signal, which is an "approximate representation" of the originally-transmitted signal 140. Loop signal 150 is called an "approximate representation" because information may have been lost in the quantization and inverse quantization processes of the line interfaces. Signal 150 is then transmitted to the site 160, where it may be used to recreate a voice signal or a binary sequence.

Information may analogously flow in the opposite direction. Destination 160 provides analog signal on loop 150 to line interface 130. Line interface 130 samples and quantizes the signal on loop 150 to provide a sequence of octets 135 to backbone 110. Backbone 110 routes these octets and provides a similar sequence of octets 135' to line interface 120. Line interface 120 provides analog signal on loop 140 to be received by the site 170.

When used for conventional data communications, as opposed to voice communications, the sites 160 and 170 may each include a modem for modulation and demodulation. A conventional modem at the site 170, for example, will receive a sequence of bits 175 from some form of an information source (e.g., a server) and modulate the bits and transmit the modulated signal, according to a communication standard, such as V.34. The modulated signal is routed to the line interface 120 where it is filtered, sampled, and quantized, as outlined above. Eventually a representative signal is received by the other modem at site 160, where it may be demodulated, and the decoded binary information is transmitted to computer 180.

Systems following the above conventional arrangement have achieved transmission rates of approximately 30 Kb/s, the conventionally-accepted view of the telephone channel's capacity. This accepted limit of capacity is dependent on the "noise" in the system, and in particular, the quantization noise of the line interfaces and robbed bit signaling, described later.

The invention attains higher transmission rates yet operates in arrangements having conventional analog local loops, unlike the ISDN and similar approaches, outlined above. In short, the invention is able to attain these advantages by considering the conventional network from a new perspective. Under this new paradigm, the invention reconsiders, and where appropriate combats with new processing techniques, the various forms of "noise" that limit the information capacity.

More specifically, the invention treats a signal s (t) on the local loop 150 as a discrete baseband signal and the inverse quantization process in line interface 130 as a baseband modulation that yields the baseband line interface signal s (t). The modulation technique is akin to PAM in that a signal's amplitude is used to modulate a waveform, but different from conventional PAM in that the amplitudes of the signal points are non-uniformly-spaced. The signal s (t) is in the form $$s(t) = \Sigma_n \, a \, (v_n) g \, (t-nT) \quad (1)$$

In equation (1), the sequence $v_n$ represents the octets 125' received from the digital backbone 110; a $(v_n)$ represents the amplitude of the quantization level corresponding to octet $v_n$ 125' according to the relevant quantization rules, e.g., µ-law; T equals the sampling interval of the system, e.g., 125 µs; and g (t) is an interpolation function (or the modulation waveform) which is bandlimited to approximately 4000 Hz.

The new perspective yields powerful results, the most important of which is that, unlike conventional systems, embodiments of the invention are not limited in their capacity to carry information by the quantization noise inherent in the line interfaces. One embodiment, for example, attains 56 Kb/s.

To better understand the new paradigm, refer to system 200 shown in FIG. 2. In system 200, backbone 110, line interface 130, and computer 180 remain unchanged from the conventional components, outlined above. A first site 270, such as an Internet server site, communicates with a digital adaptor 220, or digital modem, by sending signals over a high-speed link 240. The digital adaptor 220 sends a sequence of octets 225 to backbone 110. Analogously to that described above, backbone 110 sends a similar sequence of octets 225' to conventional line interface 130. Line interface 130 then inverse quantizes octets 225' and transmits the baseband-modulated, line interface signals, outlined above, on loop 250. Analog adaptor 260 receives the baseband signal and may, in turn, possibly equalize and sample the baseband signal, detect the binary information in the demodulated signal, and send the results to computer 180. A reverse path from analog adaptor 260 to digital adaptor 220 may be constructed using conventional modem techniques, for example, V.34 technology, or other technologies can be employed. Moreover, V.34 and other modulation logic may be included as a "back-off" scheme, providing a baseline of functionality if the system is unable to implement the inventive communication techniques described here.

In an exemplary embodiment, useful for description, signal 240 represents a sequence of bits. These bits are encoded in digital adaptor 220 into a sequence of octets 225, which travel to the line interface 130 with minimal alteration (more below). At the line interface 130, the received octets 225' are used to construct an analog baseband modulated signal on loop 250 according to equation (1) and as specified by the relevant μ-law or A-law rules. This latter step, from the perspective of the invention, is now considered as baseband modulation, which as outlined above may be thought of as a variant of PAM, in which the signal constellation corresponds to the μ-law or A-law rules. As will be explained below, an exemplary embodiment uses a subset of the quantization levels to form the signal constellation. The baseband signal is received by the analog adaptor 260, which, possibly after equalization, samples the received baseband signal at the symbol rate, detects the binary information in the sampled signal, and sends the results to computer 180, for example. Among other things, the exemplary arrangement 200, unlike the conventional arrangement 100, avoids quantization noise as a limiting factor to the system's transmission capacity by avoiding analog local loop on one side of the connection, i.e., where loop 140 exists in the conventional arrangement.

Under the new paradigm of FIG. 2, the system 200 is theoretically capable of transmitting data at rates of about 64,000 b/s and more precisely at the rate of the backbone 110, i.e., 8,000 octets per second. (Consequently, if the backbone operated at a faster rate, the transmission rate of the invention could scale correspondingly) To approach the 64,000 b/s rate, however, all of the quantization levels must be used in modulating the baseband signal; that is, each of the quantization levels would correspond to a signal point of a 255-point, one-dimensional constellation. (μ-law has 255 quantization levels)

An exemplary embodiment trades some of the theoretically possible bit rate for noise resistance. In particular, though quantization noise is alleviated, noise resistance may help combat other noise in the system.

More specifically, the spacing between some of the adjacent quantizer levels in μ-law and A-law is relatively small. Consequently, the "minimum distance," or $d_{min}$, is small of a signal constellation that includes these adjacent μ-law and A-law levels as signal points. ($d_{min}$ is a known parameter for characterizing the performance of a signal constellation in an uncoded system, and in short, $d_{min}$ refers to the shortest "distance" between different levels in a signal constellation. The distance may be measured according to different known metrics, such as Euclidean distance or Hamming distance.)

Consequently, an exemplary embodiment uses a subset of the μ-law or A-law quantization levels as valid levels in the signal constellation. By properly choosing the subset, the minimum distance of the constellation may be increased significantly, but at the expense of reducing the bit rate by sending fewer bits of information per signal point. Using such a subset allows the system to attain transmission rates approaching 56 Kb/s, yet attain desirable levels of noise resistance. Trellis codes and known schemes may be used to improve noise resistance, for example, by choosing signal points from the constellation outlined above and carrying information in the sequence of transmitted signal points, rather than in a single signal point.

The above system 200 and the corresponding paradigm depart from the conventional arrangement 100 to attain significant advantages, but it also creates design problems and issues with no parallel in the conventional arrangement. Among other things, the new arrangement creates problems of 1. ensuring that the signal 225 is appropriately modified, or spectrally shaped, to improve overall performance;
2. ensuring that the analog adaptor 260 has precise enough timing to properly sample the baseband modulated signals received on loop 250;
3. combating certain distortion introduced by the digital backbone such as "robbed bit signaling," which otherwise would effectively act as a form of noise limiting the system's capacity;
4. handling intersymbol interference (ISI) generated by the line interface 130 and the loop 250 so that the transmitted binary information sent by the source 270 may be recovered; and
5. combating various forms of system-introduced noise, such as memory-less nonlinear distortion from the line interface 130, so that the binary information transmitted sent by the source 270 may be recovered.

I. The Digital Adaptor and Spectral Shaping

The digital adaptor 220 receives data from the site 270, for example, in the form of a bit stream from a Local Area Network (LAN) or the Internet. The digital adaptor 220 encodes the incoming bit stream 240 into a sequence of octets 225, which are transmitted to the backbone 110.

The line interface 130 converts the sequence of received octets 225' into a sequence of quantization levels. In certain situations, it is desirable to shape the frequency spectrum of this sequence to combat the effects of certain forms of distortion. For example, it may be desirable to avoid placing any energy at DC to avoid certain distortion that may be created by such energy. Such distortion may present a significant impairment to data communications.

The system uses a novel mechanism to spectrally shape the sequence of quantization levels to be transmitted. The spectral shaping assures that the transmitted spectrum attain the desired characteristics, while minimizing any impact on achievable transmission rates. This aspect is described in the U.S. Pat. Apl. entitled Device, System and Method for Spectrally Shaping Transmitted Data Signals, identified and incorporated above.

II. The Analog Adaptor and Timing Recovery to Properly Sample Signals

Figure 4B:
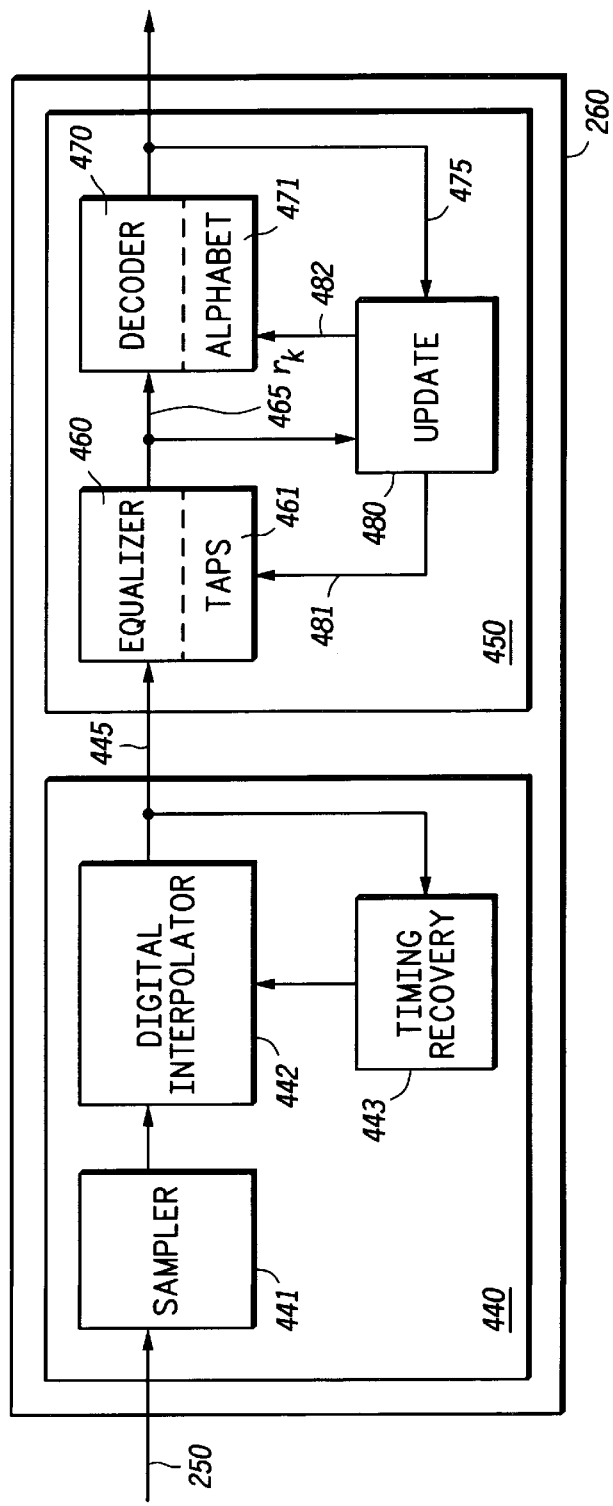

Referring briefly to FIG. 4B, the analog adaptor 260 includes a section 440 for sampling the baseband signal received from the local loop 250 at the symbol rate, possibly before or after equalization, and a section 450 for detecting, or estimating, the binary information in the demodulated signal 445. The received baseband signal may first be sampled at a higher sampling rate, and then re-sampled at the symbol rate after equalization.

The system includes novel mechanisms for providing the timing signals used for sampling the signals 250. This aspect is described in the U.S. Pat. Apl. entitled Device, System and Method for Adaptive Self-Noise Cancellation for Decision-Directed Timing Recovery, identified and incorporated above.

III. Detecting, Characterizing, and Mitigating Robbed-Bit Signaling

Robbed bit signaling (RBS) is a technique used by the telephone company to perform various control functions on the telephone network 100. In short, RBS involves the telephone system's 100 modifying data transmitted over the backbone, in particular, the least significant bit (LSB) of certain octets in an octet sequence 225. The above description of FIGS. 1 and 2 alluded to RBS by distinguishing between output signals 125', 225' and the originally-transmitted input signals 125, 225. Though RBS is generally acceptable when the octets are used to carry a voice signal, it effectively acts as noise or distortion and may limit the information-carrying capacity of the system 200 when the octets are used to carry data signals.

To combat the capacity-limiting effects of RBS, an exemplary embodiment divides the problem of RBS into (a) detecting the presence of RBS and characterizing the type of RBS; and (b) selecting a mitigation technique tailored to the specific characteristics of RBS present. To better understand the invention, an overview of RBS is first provided, followed by a description of various embodiments of mechanisms for detecting, characterizing, and mitigating the effects of RBS.

a. RBS

Many modern backbones 110 are constructed as T-carrier systems. T-carrier systems use a technique called robbed bit signaling that modifies octets 225 transmitted over the backbone 110.

FIGS. 3A–C show exemplary octet sequences that may be helpful in describing the effects of RBS. FIG. 3A shows an exemplary sequence 310 having twenty-four octet intervals, each interval carrying an octet, e.g., $O_{23}$. The octet sequences transmitted over the backbone are continuous, and the 24 octet window is for descriptive convenience only.

FIG. 3B shows an exemplary sequence 320 in which some of the intervals are affected by RBS ("affected intervals"). By this it is meant that the backbone will use the least significant bit (LSB) position of the octet data in that interval to carry data injected by the backbone's components. Thus, for example, the first octet interval 306 is affected by a type of RBS that forces the LSB of that octet to one ("F1 RBS"). Depending on the octet carried in that interval, F1 RBS may change the octet's data. In particular, if that octet had a zero in its LSB, the F1 RBS alters that octet; if that octet had a one in its LSB, the F1 RBS would have no effect from the end-user's perspective. It has been observed that RBS has deterministic periodicity with the most basic period being six octet intervals. Thus, in the example of FIG. 3B, octet interval 306 is affected, as is octet interval 307, which is six intervals removed, and so on. (The designation "NC" means "no change")

Due to the nature of the backbones 110, it is possible to have more than one affected octet interval in a basic period of six. This possibility is illustrated in FIG. 3C. Like FIG. 3B, the first shown octet interval 311 is affected by F1 RBS, as is every sixth interval, e.g., 312, relative to interval 311. Within the same basic period, the second interval 313 and the fifth interval 315 are also affected.

The second octet interval 313 is affected by a type of RBS that forces the LSB of that octet to zero ("F0 RBS"). Like the above, the effect of this RBS in this interval depends on the octet data carried in this interval. Octet interval 313 is affected, as is octet interval 314, which is six intervals removed, and so on.

The fifth octet interval 315 is affected by a type of RBS that forces the LSB of that octet to a randomly selected value from the set of zero and one ("FR RBS"). (This randomness is from the end-user's perspective only; from the perspective of the backbone which is using this bit position to carry control information the selection is deterministic) The effect of FR RBS in this interval depends both on the octet data carried in this interval and the value which the backbone 110 injects into this bit position. Octet interval 315 is affected, as is every other octet six intervals removed, e.g., 316. It is believed that an octet window of twenty-four intervals may be sufficiently long to characterize the presence, or absence, and type of RBS in each interval.

b. Detection and Characterization of RBS

The general approach for detecting and characterizing RBS is to analyze signals received by the adaptors to determine which (if any) octets in the sequences 225, 235 are affected by RBS and to determine the specific characteristics of the RBS, if present. As will be explained below, one embodiment performs the above via an uplink channel, in which an analog signal is sent from the analog adaptor 260 and the detection is performed in the digital adaptor 220. Another embodiment performs the above via a downlink channel, in which a digital signal is sent by the digital adaptor 220 and the detection is performed in analog adaptor 260. In either case, conventional DSP hardware and programming techniques may be used to implement the novel logic described below.

An exemplary embodiment detects and characterizes RBS during what is known as a start-up phase, or link establishment. For example, the detection and characterization may be part of a "training" phase following establishment of the connection between analog adaptor 260 and digital adaptor 220. This training may precede other training operations such as initialization of equalizer tap coefficients within the analog adaptor 130, as described in the related U.S. application, entitled System and Device for, and Method of, Processing Baseband Signals to Combat ISI and Nonlinearities in a Communication System, identified and incorporated above.

i. RBS Detection and Characterization on the Uplink

One embodiment detects and characterizes RBS on the uplink. The detection and characterization are accurate for the uplink path and create an inference of the RBS on a corresponding downlink. Among other things, detection and characterization of RBS on an uplink infers at least the presence of RBS on the downlink.

In an exemplary embodiment, logic within analog adaptor 260 causes signals having certain characteristics, described below, to be sent on loop 250. A variant of these signals, in particular signals 235', are received and examined by digital adaptor 220. Based on the examination, the presence and type of RBS may be detected and characterized.

In particular, analog adaptor 260 includes logic to cause a time-varying signal to be sent on loop 250, which will be received by line interface 130. The time-varying signal is converted into a corresponding octet 235 sequence and transmitted over the backbone 110. The backbone 110 sends octets 235' to digital adaptor 220. The presence and type of RBS will determine whether 235' is identical or dissimilar to 235 and, if dissimilar, how so.

The digital adaptor 220 includes logic that cooperates with the logic in the analog adaptor 260, described above. This cooperation may be initiated as part of the start-up phase, referred to above.

In an exemplary embodiment, the combination of digital and analog adaptor logic detects and characterizes the RBS in two steps: first, the logic determines for each octet interval in an octet window whether F1 or F0 RBS is present; second, if F1 or F0 RBS is not present for an octet interval, the logic distinguishes between the possibilities of no RBS in that interval or FR RBS.

Figure 5:
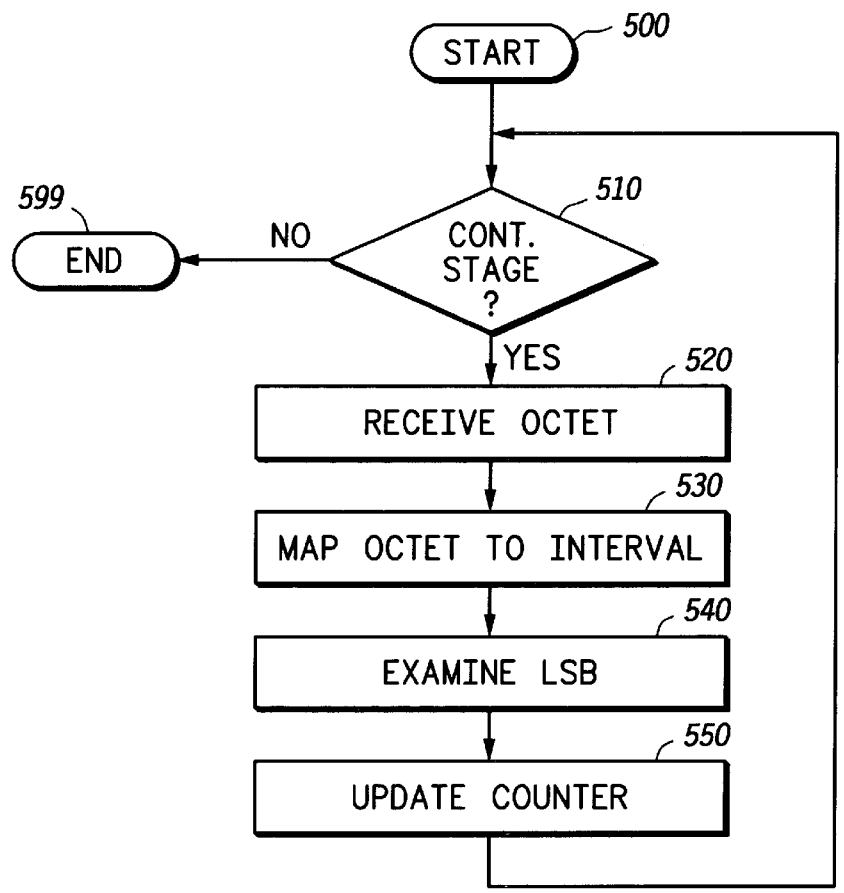
FIG. 5 is a flow chart illustrating logic of an exemplary embodiment of the invention.

More specifically, an exemplary embodiment of logic in the digital adaptor 220 examines the octets 235' received during the training phase and by observing their LSBs constructs a characterization map, describing the affects of RBS on the octet intervals of a twenty-four interval octet window. Forty-eight counters are maintained, two counters for each interval of the window. Referring to FIG. 5, the logic begins in step 500 and proceeds to step 510, where it is determined whether this stage of detection and characterization are complete. This may be done by maintaining an octet count and determining that a given number of training octets 235' have been received and analyzed, as described above, or it may be done by maintaining a time count or analogous means. Each octet 235' is received in step 520 and is mapped to one of the twenty-four intervals in the window in step 530. The LSB of the received octet 235' is then examined in step 540, and for the mapped interval, in step 550, one of the two counters is incremented if the received octet 235' has its LSB equal to logical zero, and the other of the two counters increments if the received octet 235' has its LSB equal to one. The logic repeats back to step 510.

In the absence of RBS, the time-varying signal, caused by the logic in analog adaptor 260, is expected to create a fairly even distribution of octets 235' having LSBs equal to zero and one. The presence of RBS, however, will affect this expected distribution.

For example, if RBS is present and of the F0 or F1 type, the counters for the corresponding RBS-affected interval are expected to indicate a large imbalance of the octets favoring the LSB being zero or one. In fact, the counters could indicate that all octets 235' were zero or one.

On the other hand, if there is no RBS in a given phase, or if RBS is present but is of the FR type, the counters for the corresponding octet intervals are expected to indicate roughly the same number of octets 235' having LSB equal to zero and one.

One embodiment of digital adaptor 220 logic analyzes the counter values in view of the above to detect the presence of F0 or F1 RBS. Each octet interval in the octet window, so identified, is marked as such. For the above analysis, the transmitted octet sequence 235 need not be completely known and instead all that needs to be known is that in statistical terms the sequence is sufficiently long and has sufficient variation to cause the octets 235 to have the LSBs differ.

The remaining intervals of the window, i.e., the non-F0 and non-F1 affected intervals, may have no RBS in that interval or they may have FR type RBS. One embodiment of logic in digital adaptor 220 and analog adaptor 260 cooperate to distinguish between no RBS and random RBS by using an additional training sequence, or characterization stage. More specifically, the digital adaptor 220 resets its counters for the second characterization stage, and the analog adaptor 260 logic causes a constant analog signal to be transmitted on loop 250, preferably a "zero." The constant signal on loop 250 is expected to cause the octets 235 to have a constant value. (This expectation may be affected if large noise is present on loop 250) The received octets 235' may differ depending on the presence or absence of FR RBS.

More specifically, the digital adaptor 220 again follows the logic described above with reference to FIG. 5. The logic in the digital adaptor 220 then analyzes the counters for the remaining intervals that need to be characterized. If RBS is not present, the counters should indicate that essentially all received octets 235' had LSB equal to one of the set of zero and one. On the other hand, if FR RBS is present, the counters are expected to indicate a roughly equal number of octets 235' having LSB equal to zero and one. The characterization map is updated accordingly.

Other techniques may be used, such as statistical analysis, to distinguish between no RBS and FR RBS.

ii. RBS Detection and Characterization on the Downlink

Another embodiment detects and characterizes RBS on the downlink. This embodiment includes a digital adaptor 220 having logic that causes an octet sequence 225, having known characteristics, to be sent to backbone 110. This octet sequence 225 may be different from the octet sequence 225' received by the line interface 120, and therefore, the baseband signals on loop 250 may differ from the baseband signals that correspond to the octet sequence 225 transmitted by digital adaptor 220. By analyzing the received baseband signals, the presence or absence and the specific characteristics of RBS may be determined.

Figure 6:
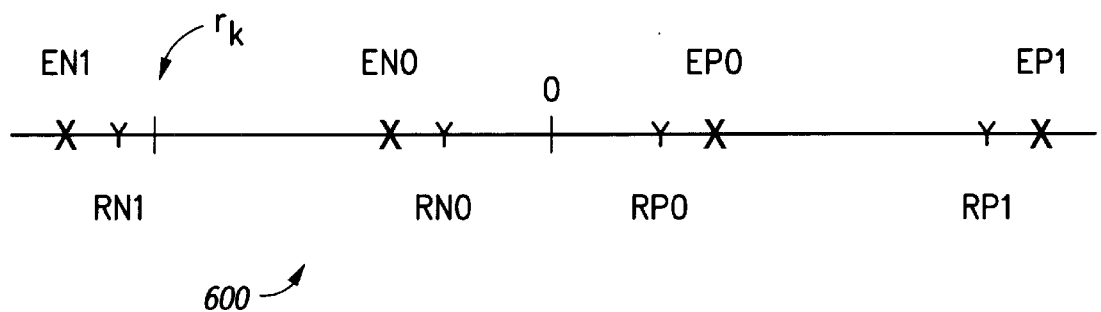
FIG. 6 is an exemplary constellation of an exemplary embodiment used to detect and characterize robbed bit signaling on a backbone.

The principles underlying this exemplary embodiment may be better understood by referring to the 8-point signal constellation 600 shown in FIG. 6. This constellation corresponds to the baseband signals received by analog adaptor 260. Each signal point has a corresponding octet analogy because each octet 225' received by line interface 130 produces a unique baseband signal on loop 250 and vice versa. The constellation is one dimensional, as the baseband signals on loop 250 carry their information in the signal's amplitude component, and the octet analogies (i.e., the octet causing that baseband signal) carries its information in the binary encoding.

A hypothetical first set of four signal points is shown as EN1, EN0, EP0, and EP1 (the Xs). The set of four is chosen to be symmetrical about the origin of constellation 600. (The desirability of this symmetry is discussed below) Two of the signal points EN1 and EP1 correspond to octet analogies having an LSB equal to one, and the other two EN0 and EP0 correspond to octet analogies having an LSB equal to zero. The set of four is chosen so that the baseband signals have relatively large amplitude differences to ease the adaptor's 260 detection and decoding of these signals.

A hypothetical second set of four signal points, i.e., RN1, RN0, RP0, and RP1, correspond to the first set of signal points, outlined above. In particular, each signal point in the second set corresponds to inverting the least significant bit of the octet analogies of the first set of signal points.

The exemplary digital adaptor 220 includes logic that will send an octet sequence 225 in which each octet is chosen from the first set of signal points, i.e., the first set's octet analogies, and in which no signals from the second set are sent. These octets 225 are then sent over the backbone and exit as octets 225'. As described above, the octets 225' may differ from the transmitted octets 225, depending on whether RBS affects the given octet interval, the type of RBS present, and the data carried in that octet interval. Thus, for example, if an octet interval has the octet analogy for EN1 or EP1, the octet 225' received by the line interface 130 will differ from the transmitted octet 225, if that interval is affected by F0 RBS, or if it is affected by FR RBS in an interval in which the backbone 110 happens to inject a zero in that octet's LSB. If that interval is affected by F1 RBS, the received octets 225' will not differ from transmitted octets 225, because the F1 RBS will in effect inject a one in an LSB that was already carrying a one.

In the above example of sending EN1 or EP1, F0 or FR RBS (with the limitation stated above) are detectable at the analog adaptor 260 by comparing the received signal $r_k$ vis-à-vis the signal constellation 600. In the example shown, $r_k$ is closer to RN1 and the adaptor logic would thus mark that the corresponding octet interval was RBS affected. One sample would be insufficient to characterize the RBS as F0 or FR RBS, but further testing could.

In particular, by sending a sufficient number of symbols with sufficient variation in each of the intervals, the presence and type of RBS may be detected and characterized by comparing the received signals $r_k$ to the signal constellation 600. This logic would be analogous to the logic described with reference to FIG. 5. That is, a varying sequence of octets from the first set can be sent first to detect the presence of F0 or F1 RBS at each octet interval. Another stage of detection and characterization could then be used to distinguish between no RBS and FR RBS.

A symmetrical constellation 600 helps avoid an energy bias in the octet sequence. An unsymmetrical constellation in principle could work but would require tailoring of the sequence, weighing some signal points in favor of others to avoid the energy bias. If the energy bias is not avoided certain types of distortion may be introduced by the system that could compromise the accuracy of the detection and characterization.

The above description did not fully consider the effects of noise or ISI on the adaptor's 260 ability to decode the received signal $r_k$. That is, although the above description stated that the detection and decoding of $r_k$ may be eased by appropriate selection of signal points for the first set, the effects of ISI and other noise may make the interpretation of $r_k$ inaccurate.

Though the above general scenario is still applicable, that is, sending a sequence of octets from a first set and decoding a received symbol in comparison to a constellation that includes the first set and also includes a second set of signal points for RBS-affected signals, the actual mechanisms for detecting the received signals vis-à-vis the constellation 600 are more complicated than simply looking at the amplitude level of the baseband signal received by the analog adaptor 260.

To this end, one embodiment, shown in FIGS. 4A–B, uses a Viterbi detector 470 in conjunction with an adaptive linear equalizer 460, having a partial response of $1-D^2$.

For purposes of detecting and characterizing RBS, one embodiment uses a two state trellis to decode the potential states of the equalizer's 460 output 465. If the sequence of transmitted symbols is known at the analog adaptor, the adaptor's 260 logic needs only have a trellis state for an unaffected and an affected received signal. If the transmitted sequence is not known, the trellis becomes more complicated, e.g., 8 or more states.

The related application System and Device for, and Method of, Processing Baseband Signals to Combat ISI and Non-linearities in a Communication System, identified and incorporated above, describes inventive ways to train a decoder and an equalizer to the actual alphabet used by the communication system rather than using the proscribed alphabet. The use of an actual alphabet may be exploited in the current context as well. That is, the E and R signal points above correspond to an actual alphabet that depends on the fidelity of the line interface 130. The actual alphabet may deviate from the proscribed alphabet, i.e., the amplitude levels proscribed by the $\mu$-law ITU recommendation.

c. Mitigation of RBS

An exemplary embodiment includes logic to mitigate the effects of the RBS present in the system. The mitigation techniques can be employed on an octet interval-by-interval basis, so that the mitigation techniques are tailored to the RBS affecting a given octet interval as identified in the characterization map, constructed during the characterization stage. Therefore, following RBS detection and characterization, the analog adaptor 260 will be aware that RBS is present and may also be aware of which octet intervals are affected by RBS and the type of RBS affecting each interval.

Referring again to FIG. 2, each octet 225 sent by digital adaptor 220 represents some number of data bits n, typically fewer than eight data bits per octet 225. The number of data bits per octet may be fixed for each octet interval or may vary depending on the coding scheme being used. As described above, RBS in the backbone network 110 transforms octets 225 into octets 225' and therefore may introduce errors. One embodiment of the invention includes logic in the analog adaptor 260 to mitigate the effects of RBS. Another embodiment includes cooperating logic in the digital adaptor 220 and the analog adaptor 260 to mitigate RBS while attaining an improved level of noise resistance in comparison to the prior embodiment.

In the below embodiments, the analog adaptor maintains synchronism of a received octet vis-à-vis the octet intervals in the characterization map. One embodiment, described below, in which the digital adaptor cooperates in the mitigation, has the digital adaptor in synchronism with the characterization map as well. Known techniques such as modulo counting of symbols may be employed to maintain the above-described synchronism. Through the use of trellis codes and other coding techniques, "frame slips" may be detected. ("Frame slip" is a loss of synchronism of a received octet vis-à-vis the octet intervals in the characterization map). When so detected, robbed bit signaling will be re-characterized as outlined above.

i. Analog Adaptor Embodiment to Mitigate RBS

This embodiment of the invention mitigates the effects of RBS with logic in the analog adaptor 260. Though the digital adaptor 220 includes logic to help in the detection and the characterization of the RBS, as was outlined above, the digital adaptor does not cooperate in the mitigation of RBS.

In this embodiment, the digital adaptor 220 uses a transmit constellation T that is a subset of the signal points possible via the underlying companding algorithm. (For convenience, the universe of signal points possible with either $\mu$-law or A-law will be called M, and two signal points in M will be called RBS-equivalent if their octet analogies differ only in the LSB) More particularly, although $\mu$-law allows 255 broadband signal points on loop 250, the adaptor 220 uses a transmit constellation T or alphabet having $2^n$ signal points, where $2^n$ is preferably less than half of the number of signal points in M. As outlined above, the actual signal points used are chosen to maximize $d_{min}$ of T.

FIG. 7 shows an exemplary portion 700 of signal constellation T containing four signal points. $T_{x0}$ is a signal point whose octet analogy has its LSB equal to zero, and $T_{x1}$ is a signal point whose octet analogy has its LSB equal to one. $T_{-x0}$ and $T_{-x1}$ are symmetrically disposed about the constellation's origin (0) in relation to the above signals. All of these signal points are members of T and M.

The octet analogies 225 are transmitted by the digital adaptor 220 over backbone 110 and eventually received as octets 225' by line interface 130. The interface 130 inverse quantizes octets 225' (which under the invention is now perceived as a modulation process) and sends baseband signals on loop 250. These baseband signals are then sampled, possibly equalized, and decoded by digital adaptor 260. The mechanisms for sampling, equalizing, and decoding are described in the related applications identified and incorporated above.

Functionally, the decoding process (implemented in section 450 of FIG. 4B) compares the received signal $r_k$ with a signal constellation to predict what signal point was most probably sent to yield the received signal $r_k$. Thus, in the example of FIG. 7A, the decoding process would indicate that the transmitted signal was most probably signal $T_{x0}$ because the distance between received signal $r_k$ and the signal point $T_{x0}$, i.e., $d[r_k, T_{x0}]$, is smaller than the distance to adjacent signal point $T_{x1}$, i.e., $d[r_k, T_{x1}]$. If RBS were not present, the digital adaptor 220 would send information by using signal points from constellation T and the analog adaptor 260 would continue to receive and decode the signal points as outlined above and as outlined in the related applications, identified and incorporated above.

As described above, however, RBS affects octet intervals and can affect the octets 225 transmitted over the backbone 110 so that the octets 225' received by the interface 130 differ from the octets 225 transmitted from the digital adaptor 220. As outlined above, whether an octet 225 is affected, depends on the type of RBS affecting that interval (i.e., F0, F1, FR) and on the actual data being carried in that octet interval.

To this end, the analog adaptor 260 of this embodiment selects an appropriate receive signal constellation based on the presence and type of RBS affecting a given octet interval. As will be explained below, this means that the analog adaptor 260 may be using a receive constellation that differs from the transmit constellation. In general, by carefully selecting T, receive constellations may be constructed so that RBS-affected received signals $r_k$ may be properly mapped to the originally transmitted octet 225.

Figure 7A:
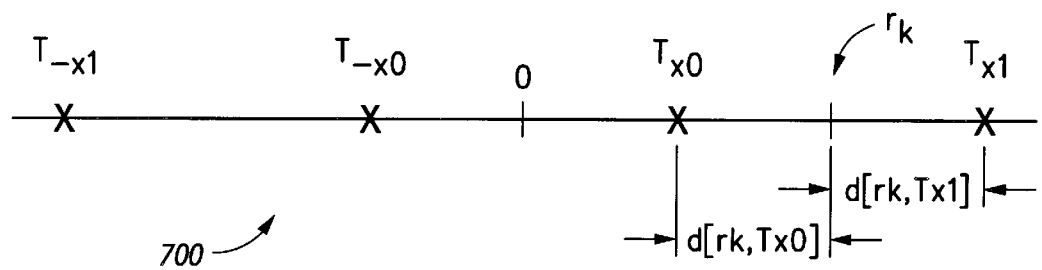
FIGS. 7A–D are exemplary transmit and receive constellations of an exemplary embodiment of the invention.
Figure 7B:
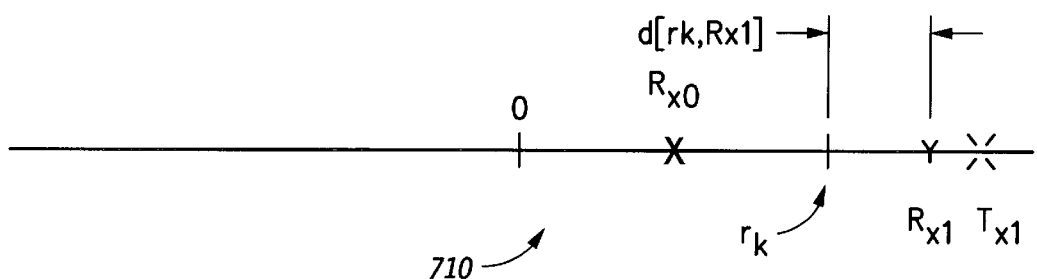

FIG. 7B, for example, illustrates this concept by illustrating a portion 710 of a receive constellation R0 used to mitigate F0 RBS. The signal points in R0 are designated with 'R's rather than 'T's to identify the signal points as being points in a receive constellation. In this example, only two signal points on the positive side of the origin are shown, but the principles described below apply to all points in the constellation.

Some of the signal points in R0 are members of T, while others are not. Specifically, R0 includes those signal points in T for which the octet analogies have LSB equal to zero (this portion of T is referred to as T0; the analogous portion of T for which the octet analogies have their LSB equal to one is called T1). R0 also includes the RBS-equivalent signal points for each signal point in T1. This latter set of points is not part of T. Receive constellation R0 is constructed this way because F0 RBS will not change any of the signal points from T0 but will change all of the signal points from T1 into their RBS-equivalent signal points. Thus, for example, signal point $T_{x1}$ is shown in dashed lines because it is excluded from the receive constellation R0, and in its place, $R_{x1}$ is included. $R_{x1}$ is the signal point whose octet analogy is the same as the octet analogy for $T_{x1}$ but with its LSB inverted. By using a constellation T that is less than half of M, signal points $T_x$ may be selected so corresponding receive signal points, e.g., $R_{x1}$, are unique, that is, not a member of constellation T. This is suggested in the Figure by not having another heavy 'X' where signal point $R_{x1}$ now resides.

The effect of new receive constellation R0 is evident by considering the case in which the same signal $r_k$ is received, as shown in the FIG. 7B. If original constellation T were used (i.e., FIG. 7a) as the receive constellation, the decoding logic would predict that $T_{x0}$ was transmitted, as outlined above. However, if for example $r_k$ were the result of sending the octet analogy of $T_{x1}$ on an octet interval affected by F0 RBS, this interpretation would be wrong. When the effects of RBS are considered, as manifested in $R_{x1}$, it is seen that the received signal is closer to the RBS-affected signal point $R_{x1}$ than it is to $R_{x0}$. That is, the effect of RBS would cause conventional decoding arrangements to incorrectly interpret the received signals. These errors would detrimentally affect the system's information carrying capacity.

To this end, the new decoding logic—by using constellation R0—can correctly predict that the most-probably-transmitted signal point was $T_{x1}$, not $T_{x0}$. The distance to the receive signal point $R_{x1}$, is smaller than the distance to adjacent signal point $R_{x0}$, which will cause the decoding logic to select $R_{x1}$ as the more probable symbol. The logic maps $R_{x1}$ to a unique point in T, namely $T_{x1}$, because $R_{x1}$, is unique vis-à-vis T, or in mathematical terms, $R_{x1}$ is not a member of T. Thus, the effects of RBS are accounted for by modifying the signal points in T that would be affected by the type of RBS. In the case of F0 RBS, the signal points that have octet analogies with LSB equal to one will be affected because the RBS will change the LSB of the octet 225 originally transmitted.

Figure 7C:
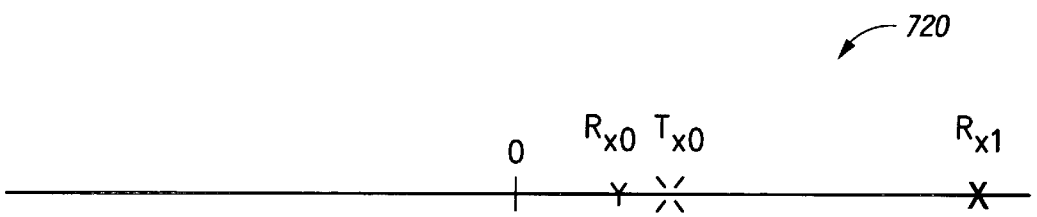

An analogous constellation R1 may be used to mitigate effects of F1 RBS. FIG. 7C shows a portion 720 using similar notation to that used for FIGS. 7A and 7B. Constellation R1 is created analogously to R0, except that R1 includes all of the signal points from T1 and the RBS-equivalent signal points for each signal point in T0. Again, the new signal points for R1 will be unique vis-à-vis constellations T.

Similar techniques are used to mitigate FR RBS. In the above examples of FIGS. 7B and 7C, the affects of RBS were constant with respect to certain signal points. For example, under F0 RBS, any signal point that had an octet analogy with LSB equal to one would be affected because the F0 RBS would invert the LSB. Under FR RBS, however, the effects of RBS are not predictable. As outlined above, under FR RBS, the backbone will inject a bit value into the LSB of the octets in the affected octet interval, but the bit value is not known a priori. Thus, there's no way of determining a priori that the signal point $T_{x1}$, for example, has no relevance in a receive constellation. The FR RBS affecting an interval carrying $T_{x1}$ may inject a one in the LSB, i.e., having no affect on the data as it already has a one in its LSB.

To this end, the receive constellation R01 used to mitigate FR RBS must account for more signal points. A portion 730 is shown in FIG. 7D and uses similar terminology and symbols to that used above.

As shown, unlike the examples of FIG. 7B and C, four signal points, rather than two, are needed. Two signal points $R_{x00}$ and $R_{x11}$ have corresponding signal points in T. These signal points respectively correspond to a signal having its LSB equal to zero in an FR RBS affected interval that injects a zero, and to a signal having its LSB equal to one in an FR RBS affected interval that injects a one; that is, intervals in which the FR RBS had no real effect on the octet 225 (thus the signal points correspond to T). The other two signal points $R_{x01}$ and $R_{x10}$ are for the opposite cases. $R_{x01}$ corresponds to a signal having its LSB equal to zero in an FR RBS affected interval that injects a one, and $R_{x10}$ corresponds to a signal having its LSB equal to one in an FR RBS affected interval that injects a zero. Signal points for the remainder of R01 are constructed analogously.

Figure 7D:
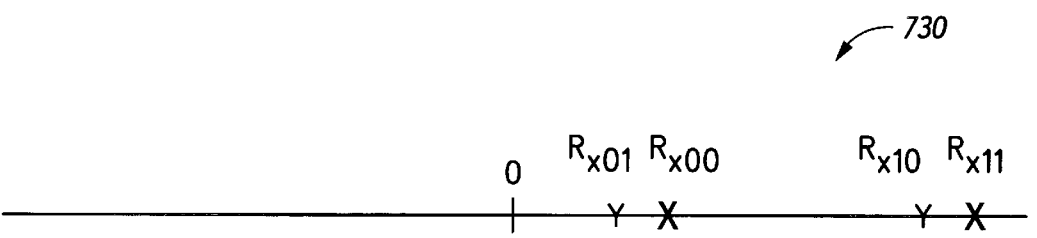

FIGS. 7B–D not only show the process of constructing receive constellations from the transmit constellation T, but also show that the receive constellations used to mitigate RBS may have a smaller $d_{min}$ than that of T. FIG. 7B for example shows that $R_{x1}$ is closer to $R_{x0}$ than $T_{x1}$ is to $T_{x0}$. The effects on $d_{min}$ are even more dramatic when considering constellation R01. This result may be shown mathematically, but the Figures should make this understanding intuitive.

Figure 8:
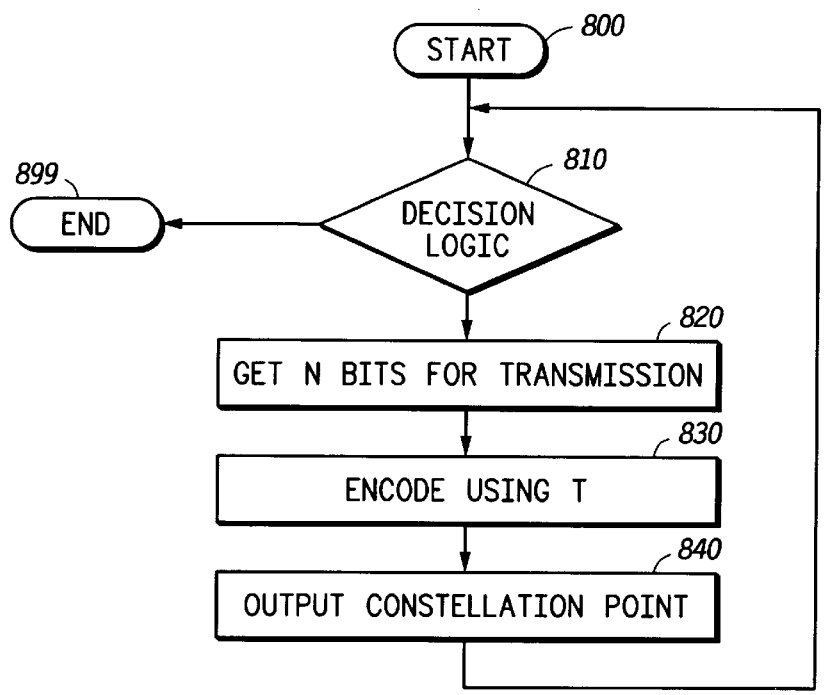
FIG. 8 is a flow diagram illustrating transmit data logic for an exemplary digital adaptor according to an exemplary embodiment of the invention.

An exemplary embodiment of digital adaptor 220 includes logic to encode a fixed number of data bits n into a constellation point (encoding data bits in accordance with a constellation is known). Referring to FIG. 8, the logic begins in step 800 and proceeds to step 810, where the digital adaptor determines whether or not any data bits remain to be transmitted. If no data bits remain to be transmitted, the logic terminates in step 899. If data bits remain to be transmitted, the logic proceeds to step 820, where the logic gets a pre-determined number of data bits for transmission. The logic then proceeds to step 830, where the logic encodes the data bits using transmit constellation T, and on to step 840, where the logic outputs the constellation point. Finally, the logic repeats to step 810.

Figure 9:
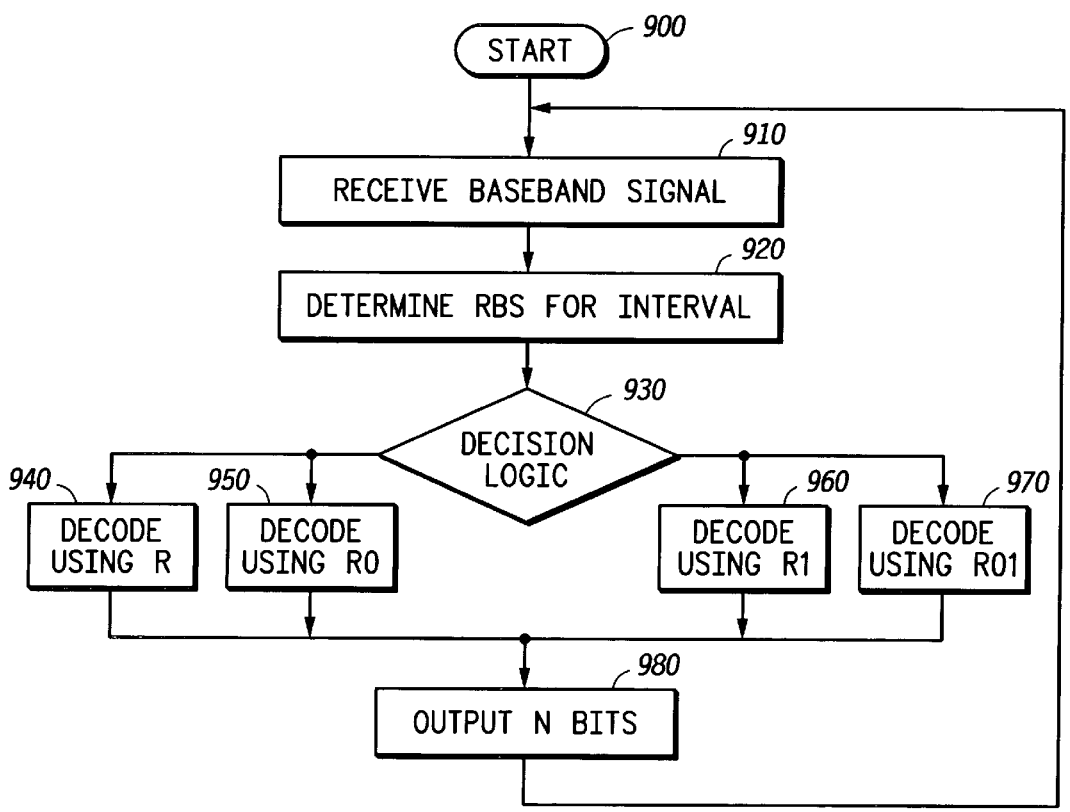
FIG. 9 is a flow diagram illustrating receive logic for an exemplary analog adaptor according to an exemplary embodiment of the invention.

A complimentary embodiment of analog adaptor 260 includes logic to select and apply an appropriate receive constellation for each octet interval based on the type of RBS present in that interval. Referring to FIG. 9, the logic begins in step 900 and proceeds to step 910, where it receives a baseband signal corresponding to a constellation point transmitted by digital adaptor 220. The logic then determines, in step 920, the type of RBS for the next octet interval and, using the decision logic in step 930, decides which receive constellation to apply. If the octet interval is unaffected by RBS, the logic proceeds to step 940, where the baseband signal is decoded using receive constellation R. If the octet interval is affected by F0 RBS, the logic proceeds instead to step 950, where the baseband signal is decoded using receive constellation R0. If the octet interval is affected by F1 RBS, the logic proceeds instead to step 960, where the baseband signal is decoded using receive constellation R1. If the octet interval is affected by FR RBS, the logic proceeds instead to step 970, where the baseband signal is decoded using receive constellation R01. After decoding the baseband signal, the logic proceeds to step 980, where it outputs n bits. Finally, the logic repeats to step 910.

Receive constellation R01 contains twice the number of signal points (i.e. $2^n$ pairs of RBS-equivalent points) than the number of signal points required for encoding. This is so because any encoded signal point can be received unmodified or modified by FR RBS. Thus, there are two receive signal points corresponding to each transmit signal point. As described above, when the analog adaptor 260 receives a baseband signal for an octet interval affected by FR RBS, the logic in analog adaptor 260 decodes the signal using receive constellation R01. Typically, decoding a received signal involves determining the signal point in the receive constellation that is closest to the received signal. However, in this case, there is a pair of signal points in R01 that can correspond to the received signal. Therefore, an embodiment of analog adaptor 260 logic determines the nearest pair of signal points by calculating the distance to each one of the pair of signal points and selecting the signal point that is closest to the received signal.

One embodiment employs a trellis code to provide error-free communications at data rates greater than or equal to 56 Kb/s in the presence of RBS (trellis coding is known). In an exemplary embodiment, constellation T is constructed so as to include more than $2^n$ signal points from M. Digital adaptor 220 encodes the bit stream of data using a trellis code. The corresponding signal point is transmitted to analog adaptor 260, where the received signal is decoded using the appropriate receive constellation and with knowledge of the trellis code to recover the trellis-encoded bits.

ii. Analog and Digital Adaptor Embodiment to Mitigate RBS

This embodiment of the invention mitigates the effects of RBS with cooperating logic in the digital adaptor 220 and the analog adaptor 260. In an exemplary embodiment, logic in analog adaptor 260 sends the characterization map to logic in digital adaptor 220 during the link establishment phase, for example, following RBS detection and characterization of the downlink. The logic in digital adaptor 220 utilizes the characterization map to select an appropriate transmit constellation for each octet interval, where the transmit constellation for each octet interval is tailored to the particular type of RBS present in that interval. Specifically, each transmit constellation is defined so that RBS has minimal (if any) effect on the transmitted signals. For example, a transmit constellation for mitigating F0 RBS will use only octet analogies having LSB equal to zero, so the F0 RBS will not modify the transmitted signals. As above, the analog adaptor 260 selects an appropriate receive constellation for each octet interval according to the type of RBS present in the octet interval.

For octet intervals unaffected by RBS, the logic in digital adaptor 220 uses a transmit constellation $T_{NC}$ which is defined by selecting signal points from the entire set M. The signal points are preferably chosen so as to maximize $d_{min}(TNC)$. Constellation $T_{NC}$ may be identical to constellation T above. For convenience, the receive signal constellation for octet intervals unaffected by RBS is referred to as $R_{NC}$, and is substantially similar to $T_{NC}$.

Similar constellations are defined for octet intervals affected by F0 RBS and F1 RBS. For octet intervals affected by F0 RBS, the logic in digital adaptor 220 uses a transmit constellation $T_{F0}$ which is defined by selecting only signal points from M for which the octet analogies have LSB equal to zero. For octet intervals affected by F1 RBS, the logic in digital adaptor 220 uses a transmit constellation $T_{F1}$ which is defined by selecting only signal points from M for which the octet analogies have LSB equal to one. As above, the signal points are preferably chosen so as to maximize $dmin(T_{F0})$ and $d_{min}(T_{F1})$. For convenience, the receive signal constellations for octet intervals affected by F0 RBS and F1 RBS are referred to as $R_{F0}$ and $R_{F1}$ respectively, and again are substantially similar to $T_{F0}$ and $T_{F1}$, respectively.

For octet intervals affected by FR RBS, the logic in digital adaptor 220 uses a transmit constellation $T_{FR}$ which is defined by selecting $2^n$ pairs of RBS-equivalent points from M. The signal points in $T_{FR}$ are chosen to maximize the minimum distance between RBS-equivalent pairs, i.e., the distance from either one of a pair of RBS-equivalent points to either one of the nearest pair of RBS-equivalent points. For convenience, the notation in the form $d_{min}(T_{FR})$ will continue to be used, but will indicate the minimum distance between RBS-equivalent pairs. The receive signal constellation for octet intervals affected by FR RBS is referred to as $R_{FR}$, and is substantially similar to $T_{FR}$.

When encoding using transmit constellation $T_{FR}$, the logic in digital adaptor 220 encodes an n-bit sequence into either one of the corresponding pair of RBS-equivalent points in $T_{FR}$. Since the transmitted signal point is affected by FR RBS, either the transmitted signal point or its RBS-equivalent signal point will be received at analog adaptor 260. The logic in analog adaptor 260 decodes the received signal point using receive constellation $R_{FR}$, finding the nearest pair of RBS-equivalent signal points in $R_{FR}$ as in the above embodiment which uses receive constellation R01.

Figure 10:
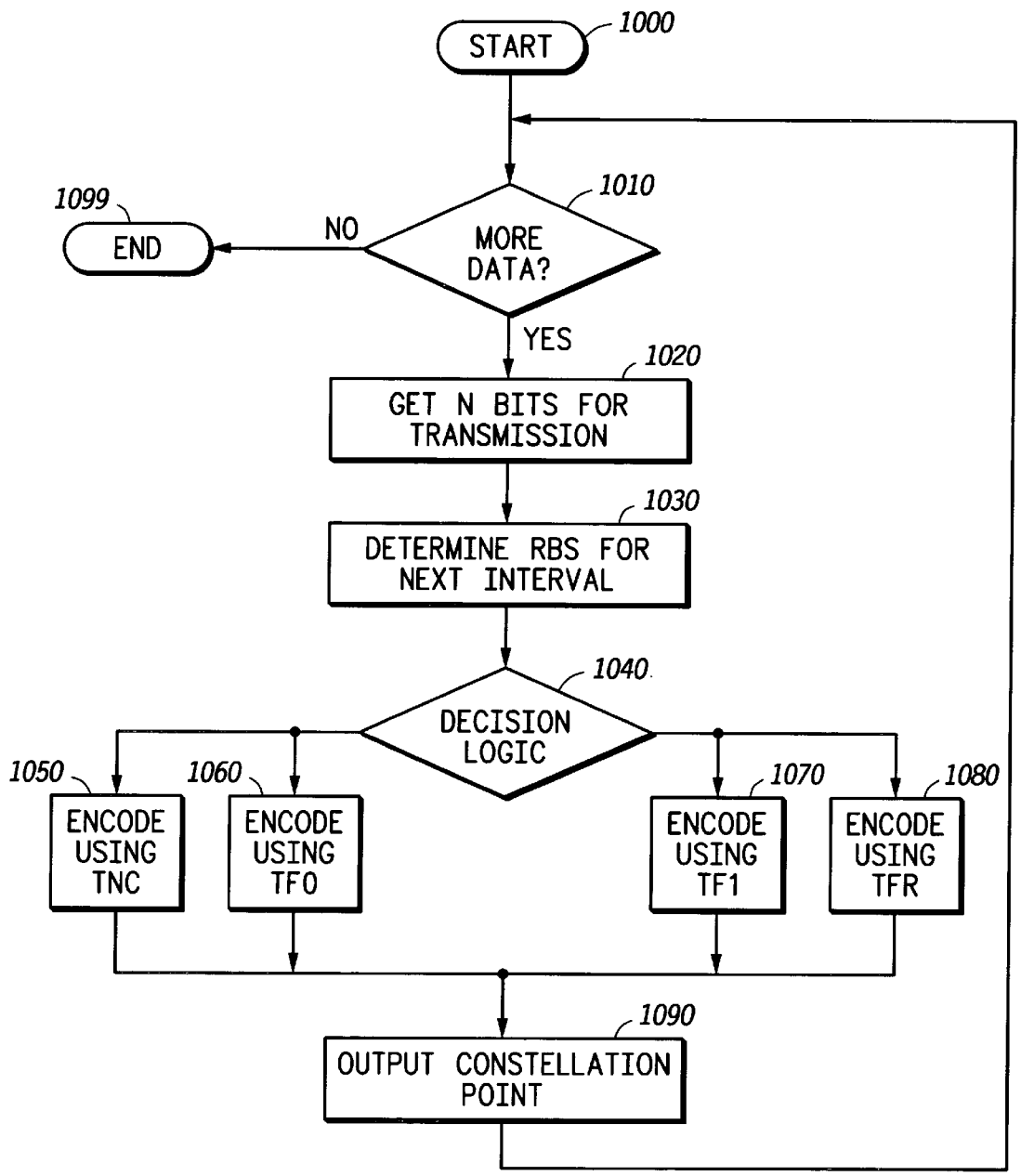
FIG. 10 is a flow diagram illustrating transmit logic for an exemplary digital adaptor according to an exemplary embodiment of the invention.

An exemplary embodiment of digital adaptor 220 includes logic to select and apply an appropriate transmit constellation for each octet interval based on the type of RBS present in that interval. Referring to FIG. 10, the logic begins in step 1000 and proceeds to step 1010, where the logic determines whether or not any data bits remain to be transmitted. If no data bits remain to be transmitted, the logic terminates in step 1099. If data bits remain to be transmitted, the logic proceeds to step 1020, where the logic gets a pre-determined number of data bits for transmission. The logic then determines, in step 1030, the type of RBS for the next octet interval and, using the decision logic in step 1040, decides which transmit constellation to apply. If the octet interval is unaffected by RBS, the logic proceeds to step 1050, where the n data bits are encoded using transmit constellation $T_{NC}$. If the octet interval is affected by F0 RBS, the logic proceeds instead to step 1060, where the n data bits are encoded using transmit constellation $T_{F0}$. If the octet interval is affected by F1 RBS, the logic proceeds instead to step 1070, where the n data bits are encoded using transmit constellation $T_{F1}$. If the octet interval is affected by FR RBS, the logic proceeds instead to step 1080, where the n data bits are encoded using transmit constellation $T_{FR}$. After encoding the n bits using the selected transmit constellation, the logic proceeds to step 1090, where it outputs the signal point. Finally, the logic repeats to step 1010.

Figure 11:
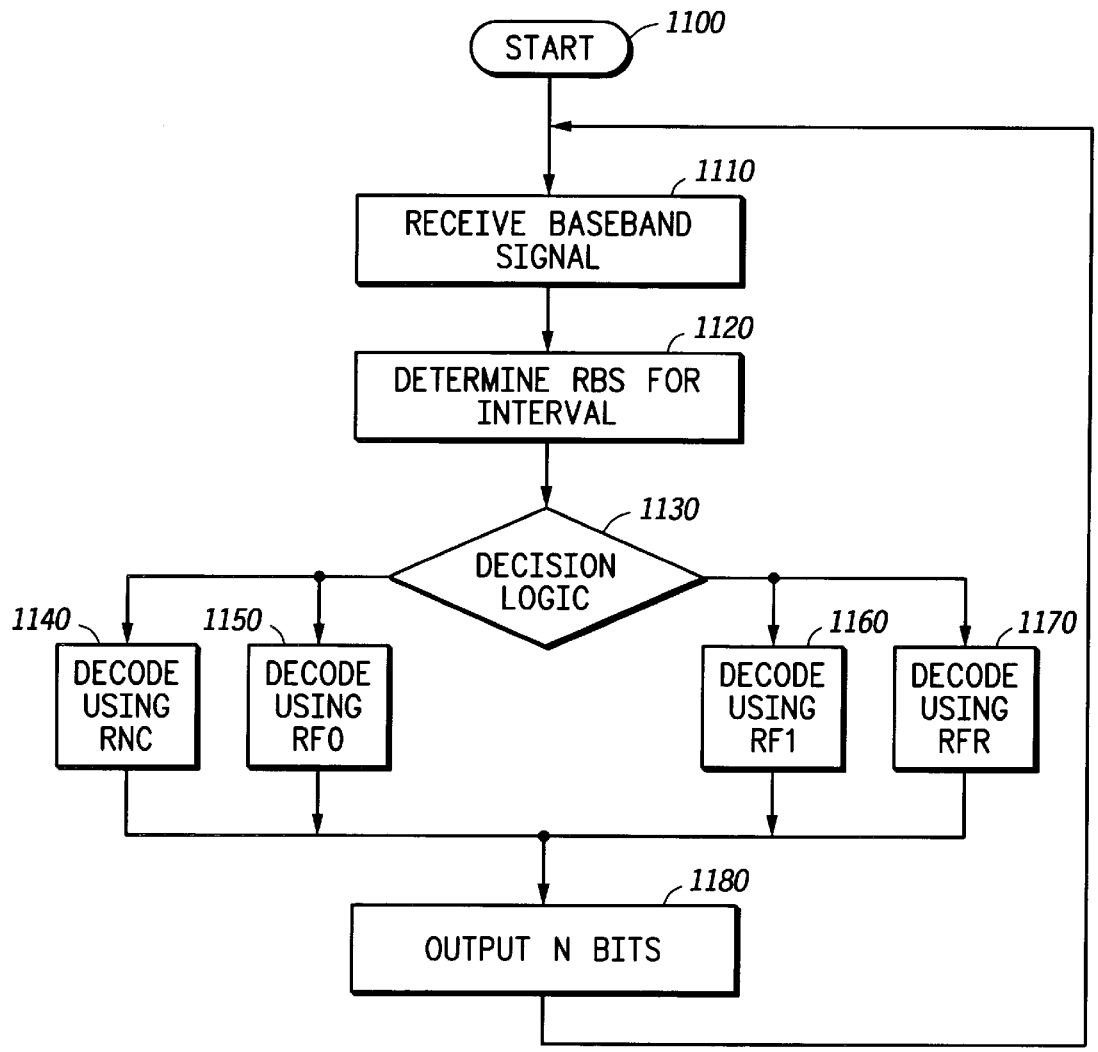
FIG. 11 is a flow diagram illustrating receive logic for an exemplary analog adaptor according to an exemplary embodiment of the invention.

A complimentary embodiment of analog adaptor 260 includes logic to select and apply an appropriate receive constellation for each octet interval based on the type of RBS present in that interval. Referring to FIG. 11, the logic begins in step 1100 and proceeds to step 1110, where it receives a baseband signal corresponding to a constellation point transmitted by digital adaptor 220. The logic then determines, in step 1120, the type of RBS for the next octet interval and, using the decision logic in step 1130, decides which receive constellation to apply. If the octet interval is unaffected by RBS, the logic proceeds to step 1140, where the baseband signal is decoded using receive constellation $R_{NC}$. If the octet interval is affected by F0 RBS, the logic proceeds instead to step 1150, where the baseband signal is decoded using receive constellation $R_{F0}$. If the octet interval is affected by F1 RBS, the logic proceeds instead to step 1160, where the baseband signal is decoded using receive constellation $R_{F1}$. If the octet interval is affected by FR RBS, the logic proceeds instead to step 1170, where the baseband signal is decoded using receive constellation $R_{FR}$. After decoding the baseband signal, the logic proceeds to step 1180, where it outputs n bits. Finally, the logic repeats to step 1110.

Referring again to FIG. 10, another embodiment applies the same transmit constellation to octet intervals having F0 RBS (i.e. at step 1060) and to octet intervals having F1 RBS (i.e. at step 1070). Exemplary logic uses transmit constellation $T_{F0}$, although transmit constellation $T_{F1}$ also works (but results in a slightly higher average power level due to the higher signal levels). If constellation $T_{F0}$ is used for both intervals, octets in intervals having F0 RBS will be unaffected, so receive constellation $R_{F0}$ is identical to transmit constellation $T_{F0}$. On the other hand, octets in intervals having F1 RBS will be changed into their RBS-equivalent octets, and therefore receive constellation $R_{F1}$ is equal to the set of RBS-equivalent points for the constellation $T_{F0}$. Conversely, if constellation $T_{F1}$ is used for both intervals, octets in intervals having F1 RBS will be unaffected, so receive constellation $R_{F1}$ is identical to transmit constellation $T_{F1}$. On the other hand, octets in intervals having F0 RBS will be changed into their RBS-equivalent octets, and therefore receive constellation $R_{F0}$ is equal to the set of RBS-equivalent points for the constellation $T_{F1}$.

In the above embodiments, where a fixed number of data bits is represented in each octet interval, $d_{min}$ of certain constellations (specifically R01, $T_{FR}$, and $R_{FR}$) may be relatively small, and, as a result, those constellations may have relatively poor performance where noise is present.

In those embodiments where the digital adaptor 220 does not participate in RBS mitigation, fewer data bits may be encoded per octet interval in order to improve noise resistance. In this way, the transmit and receive constellations have fewer signal points, and therefore $d_{min}$ is increased. However, because fewer bits are represented per octet interval, the throughput rate of the system (i.e. bits per second) is decreased.

In those embodiments where the digital adaptor 220 participates in RBS mitigation, the throughput performance may be improved by varying the number of data bits encoded for each octet interval based on the type of RBS present in the interval. In octet intervals where the appropriate transmit constellation has a relatively large $d_{min}$ (for example, octet intervals unaffected by RBS), the digital adaptor 220 encodes a pre-determined maximum number of data bits per interval. However, in octet intervals where the appropriate transmit constellation has a relatively small $d_{min}$ (for example, octet intervals affected by FR RBS), the digital adaptor 220 encodes fewer data bits per interval, using a transmit constellation having fewer signal points with a correspondingly increased $d_{min}$.

Figure 12:
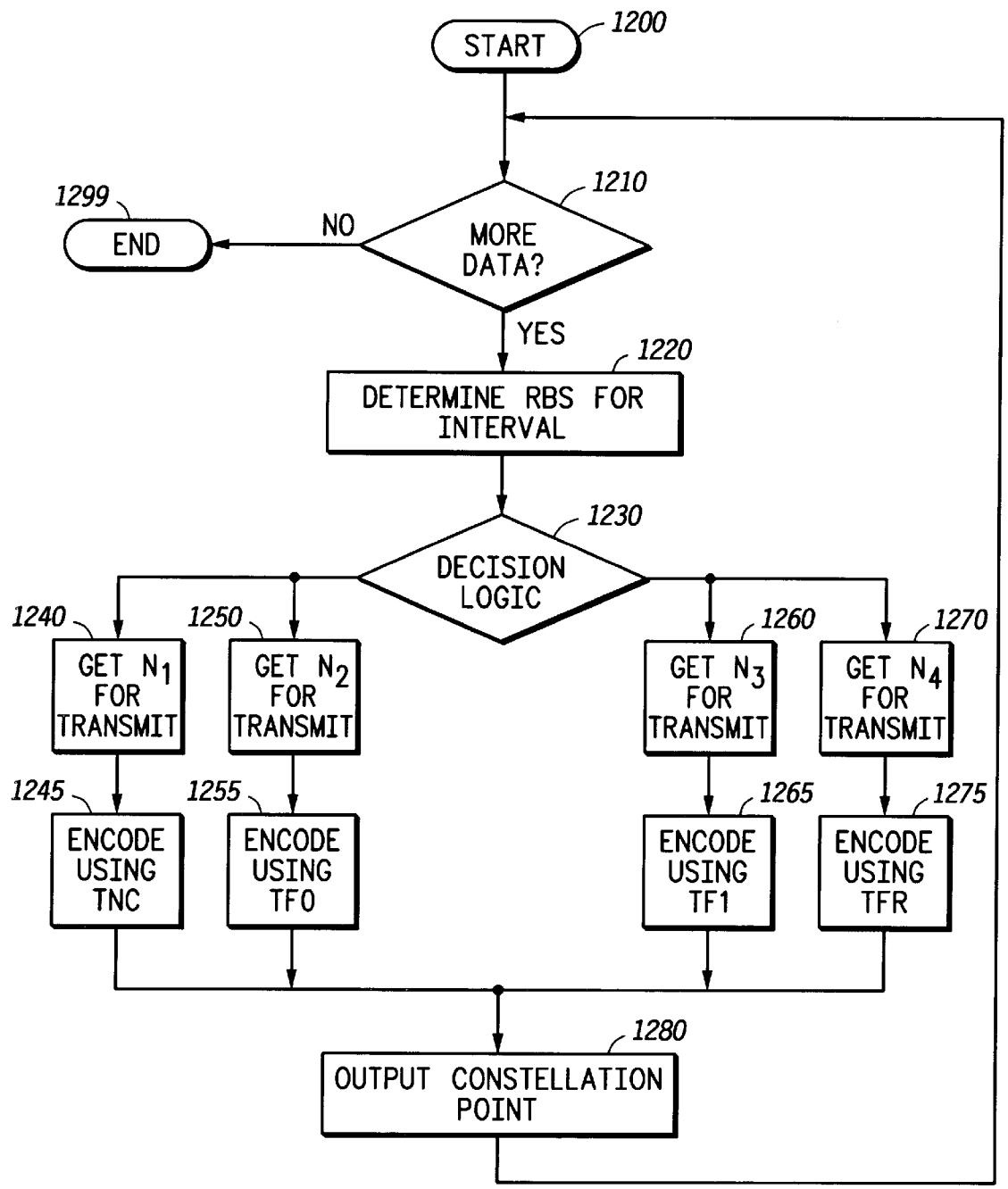
FIG. 12 is a flow diagram illustrating transmit logic for an exemplary digital adaptor according to an exemplary embodiment of the invention.

An exemplary embodiment of digital adaptor 220 includes logic to select an appropriate number of data bits, and also to select and apply an appropriate transmit constellation, for each octet interval based on the type of RBS present in that interval. Referring to FIG. 12, the logic begins in step 1200 and proceeds to step 1210, where the logic determines whether or not any data bits remain to be transmitted. If no data bits remain to be transmitted, the logic terminates in step 1299. If data bits remain to be transmitted, then the logic determines, in step 1220, the type of RBS for the next octet interval and, using the decision logic in step 1230, decides the number of data bits and the transmit constellation for that octet interval. If the octet interval is unaffected by RBS, the logic proceeds to step 1240, where the logic gets a first number of data bits for transmission, and on to step 1245, where the logic encodes the first number of data bits using transmit constellation $T_{NC}$. If the octet interval is affected by F0 RBS, the logic proceeds instead to step 1250, where the logic gets a second number of data bits for transmission, and on to step 1255, where the logic encodes the second number of data bits using transmit constellation $T_{F0}$. If the octet interval is affected by F1 RBS, the logic proceeds instead to step 1260, where the logic gets a third number of data bits for transmission, and on to step 1265, where the logic encodes the third number of data bits using transmit constellation $T_{F1}$. If the octet interval is affected by FR RBS, the logic proceeds instead to step 1270, where the logic gets a fourth number of data bits for transmission, and on to step 1275, where the logic encodes the fourth number of data bits using transmit constellation $T_{FR}$. After encoding the appropriate number of data bits using the appropriate transmit constellation, the logic proceeds to step 1280, where it outputs the constellation point. Finally, the logic repeats to step 1210.

Figure 13:
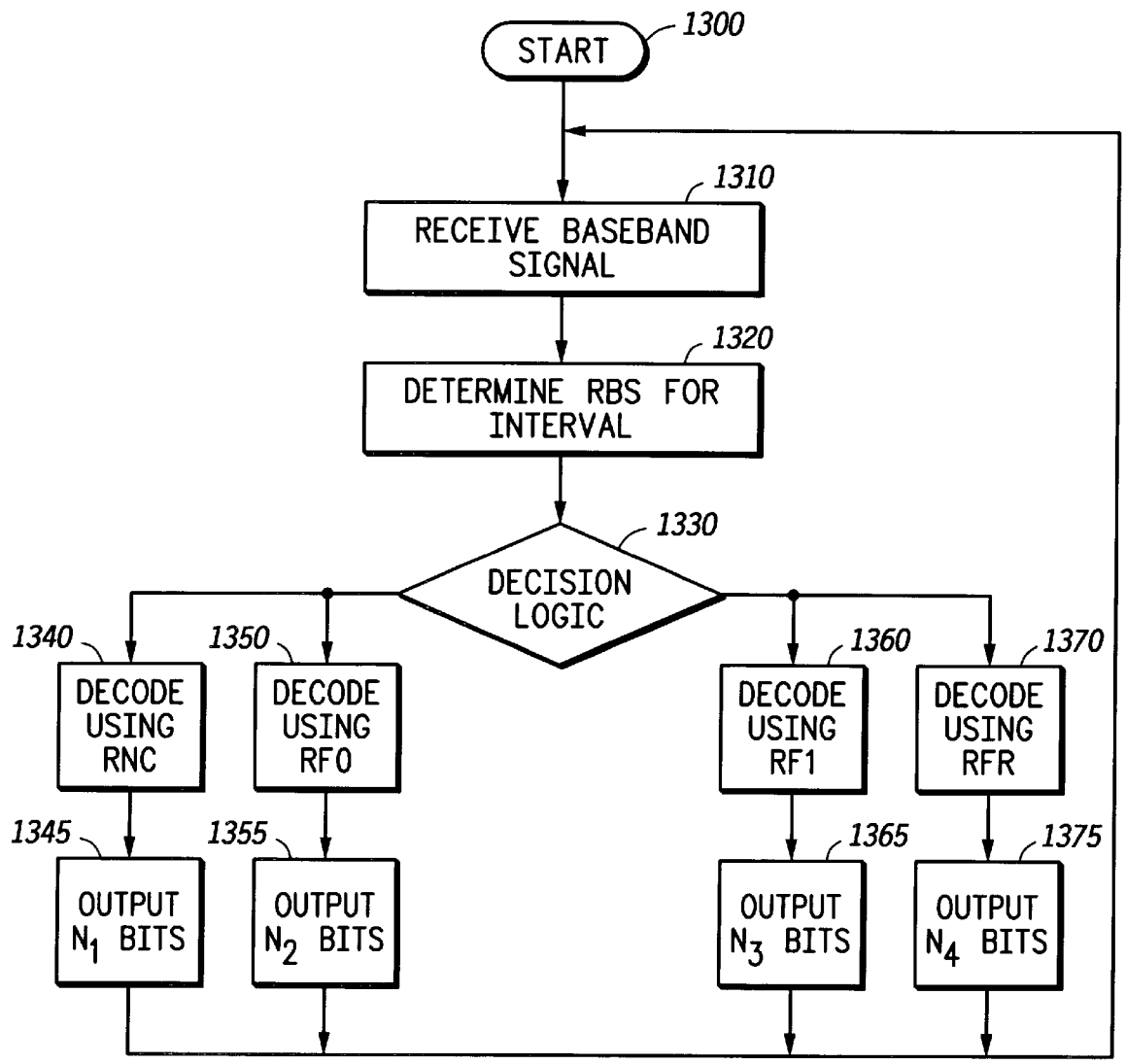
FIG. 13 is a flow diagram illustrating receive logic for an exemplary analog adaptor according to an exemplary embodiment of the invention.

A complimentary embodiment of analog adaptor 260 includes logic to select an appropriate number of data bits, and also to select and apply an appropriate receive constellation, for each octet interval based on the type of RBS present in that interval. Referring to FIG. 13, the logic begins in step 1300 and proceeds to step 1310, where it receives a baseband signal corresponding to a constellation point transmitted by digital adaptor 220. The logic then determines, in step 1320, the type of RBS for the next octet interval and, using the decision logic in step 1330, decides the receive constellation and number of data bits for the interval. If the octet interval is unaffected by RBS, the logic proceeds to step 1340, where the baseband signal is decoded using receive constellation $R_{NC}$, and on to step 1345, where the logic outputs a first number of data bits. If the octet interval is affected by F0 RBS, the logic proceeds instead to step 1350, where the baseband signal is decoded using receive constellation $R_{F0}$, and on to step 1355, where the logic outputs a second number of data bits. If the octet interval is affected by F1 RBS, the logic proceeds instead to step 1360, where the baseband signal is decoded using receive constellation $R_{F1}$, and on to step 1365, where the logic outputs a third number of data bits. If the octet interval is affected by FR RBS, the logic proceeds instead to step 1370, where the baseband signal is decoded using receive constellation $R_{FR}$, and on to step 1375, where the logic outputs a fourth number of data bits. Finally, the logic repeats to step 1310.

IV. Controlling Inter-Symbol Interference (ISI)

The backbone 110 and line interface 130 were designed and constructed for voice communications. One consequence of the design is that an interpolation filter (420, see FIG. 4A) typically found in the line interface 130 does not satisfy Nyquist's criterion when signaling at 8000 baud, causing ISI on the signal received by the analog adaptor 260.

To handle ISI, the invention uses a novel arrangement of an equalizer and a level decoder. Because the inventive arrangement for controlling ISI is also used to combat system introduced noise, to avoid a redundant description, the arrangement is discussed in the next section only.

V. Combating System-Introduced Noise

Besides ISI, the line interfaces 130 may be low fidelity and may output signals on loop 250 that deviate from proscribed levels. This deviation may cause incorrect symbol interpretation. To this end, the system includes novel mechanisms for forming an alphabet of symbols actually used by the communication system, rather than rely on proscribed levels. This aspect is described in the U.S. Pat. Apl. entitled System and Device for, and Method of, Processing Baseband Signals to Combat ISI and Non-linearities in a Communication System, identified and incorporated above.

Although the RBS detection, characterization, and mitigation techniques are discussed with respect to a novel analog adaptor 260, it will be apparent to those skilled in the art that the same techniques can be used and applied to other data and voice communications, such as standard analog modem communications.

It will be apparent to a skilled artisan that receive constellation R01 can be replaced with a receive constellation R01' having 2n signal points, where each signal point in R01' represents a pair of RBS-equivalent signal points in R01. In an exemplary embodiment, each signal point in R01' is the average of a corresponding pair of RBS-equivalent points in R01. When receive constellation R01' is used in place of R01, the number of signal points tested by analog adaptor 260 is reduced by half, although the decoding performance of the analog adaptor 260 is expected to degrade. Thus, there is a trade-off between computational complexity and noise resistance.

It will be apparent to a skilled artisan that the transmit constellations $T_{NC}$, $T_{F0}$, and $T_{F1}$ can be chosen so as to achieve, as closely as possible, a constant minimum distance among the constellations.

Although the RBS detection and characterization techniques described above are expected to be performed during a link establishment phase, it will be apparent to a skilled artisan that the same techniques can be employed from time to time in order to detect frame slips or frame loss in the backbone network. Frame slips occur in the T-carrier system due to timing slips in the network. Using the RBS detection and characterization techniques above, a frame slip in the backbone network would appear as a transposition of the RBS-affected octets.

Moreover, skilled artisans will understand that the above techniques are not limited to Viterbi detectors and that other receiver techniques are applicable, linear adaptive equalizers, non-optimal Viterbi equalizers, ML detectors, decision feedback equalizers.

Although mitigation was discussed on an interval by interval basis, skilled artisans will appreciate the applicability of other combinations, such as analyzing the characterization map and choosing a worst case receive constellation, and possibly transmit constellation, to use for all intervals.

Similarly, various combinations of dividing the logic between the digital adaptor and analog adaptor are applicable. For example, the embodiment that selects transmit constellations based on the RBS may be limited to changing transmit constellations for FR RBS alone. Analogous deviations are also applicable.

The present invention may be embodied in other specific forms without departing from the spirit or essential characteristics. The described embodiments are to be considered in all respects only as illustrative and not restrictive.

What is claimed is:

1. A method of determining whether the public switched telephone network (PSTN) is altering octets transmitted over the PSTN, wherein the PSTN includes a line interface and a digital backbone network, and wherein the line interface receives octets from the backbone network and transmits on a local loop baseband signals having amplitudes corresponding to a value of the received octet, the method comprising the steps of:

causing an octet sequence, having known characteristics, to be transmitted over the backbone network, which may alter the octets transmitted on it, receiving a sequence of baseband signals, and analyzing the received baseband signal sequence to determine whether the line interface received a different octet sequence than the known octet sequence sent in the causing step.

2. The method of claim 1 wherein the window of received signals has a length of twenty-four octets, and wherein the analyzing step determines whether the backbone network affects transmitted octets at a periodicity from the set of six, twelve, and twenty-four.

3. The method of claim 2 wherein the analyzing step determines whether the PSTN has forced to zero a least significant bit of an octet received by the line interface.

4. The method of claim 2 wherein the analyzing step determines whether the PSTN has forced to one a least significant bit of an octet received by the line interface.

5. The method of claim 2 wherein the analyzing step determines whether the PSTN has affected a least significant bit of an octet received by the line interface by setting the bit's value randomly from the set of zero and one.

6. The method of claim 1 wherein the PSTN has an octet signal constellation of 255 signal points and wherein the causing step uses no more than four octet signal points to form the transmitted sequence, the four signal points being chosen symmetrically around the octet signal constellation's origin, with two of the octets having a least significant bit equal to zero and two of the octets having a least significant bit equal to one.

7. The method of claim 6 wherein the window of baseband signals is twenty-four signals, corresponding to twenty-four octet intervals in an octet window, and wherein the causing step transmits a sufficient number of octets to allow the analyzing step to analyze multiple windows of baseband signals, and wherein the analyzing step uses an eight point constellation of baseband signal points, with a first set of four signal points being baseband signal analogies of the four octet signal points and with a second set of four signal points being baseband signal analogies to the four octet signal points, but with the least significant bit of each signal point inverted.

8. The method of claim 7 wherein the causing step transmits from the four point constellation an octet sequence to the PSTN in which the least significant bit of octets sent for each octet interval is known to vary within the time necessary to send the sufficient number of octets, and wherein the analyzing step determines for each octet interval in a window whether that interval is affected in a constant manner by finding that the received baseband signals points correspond to the line interface receiving octets with a constant least significant bit.

9. The method of claim 8 wherein, if the analyzing step fails to find that an octet interval in a window is affected in a constant manner, the analyzing step includes a step of distinguishing between the octet interval being not affected by the PSTN and the octet interval being affected by the PSTN altering a least significant bit of the octet in that interval by randomly setting the least significant bit to a value from the set of zero and one.

10. The method of claim 9 wherein the distinguishing step includes sending from the four point constellation an octet sequence to the PSTN in which the least significant bit of octets sent for each octet interval is known to remain constant, and wherein for each octet interval determining whether that interval is affected in a random manner by finding that the received baseband signals points correspond to the line interface receiving octets with a varying least significant bit.

11. The method of claim 8 wherein the causing step sends a known sequence of octets from the octet signal constellation, and wherein the analyzing step has knowledge of the known sequence and analyzes the received octets using a two state trellis in which one state corresponds to an RBS affected received octet and the other state corresponds to an unaffected received octet.

12. A digital adaptor and analog adaptor combination for communicating on a PSTN having a backbone network, a line interface for receiving octets from the backbone and for sending baseband signals representative of the received octets on a local loop and for receiving analog signals on the local loop and for sending octets representative of the analog signal on the backbone, wherein the PSTN is affected by robbed bit signaling, and wherein the digital adaptor is couplable to the backbone and the analog adaptor is couplable to the local loop, the analog adaptor comprising first logic for causing a time varying signal to be transmitted on the local loop; and second logic for causing a constant signal to be transmitted on the local loop; and wherein the digital adaptor comprises third logic, cooperating with the first logic, for analyzing octets received by the digital adaptor from the backbone to determine the distribution of octets having an LSB equal to zero and one;

fourth logic, cooperating with the second logic, for analyzing octets received by the digital adaptor from the backbone to determine the distribution of octets having an LSB equal to zero and one; and fifth logic, cooperating with the third and the fourth logic, for characterizing an octet window, having octet intervals, in which each interval is characterized as being one of affected by no robbed bit signaling, affected by robbed bit signaling that forces a least significant bit of octets in that interval to a zero, affected by robbed bit signaling that forces a least significant bit of octets in that interval to a one, and affected by robbed bit signaling that forces a least significant bit of octets in that interval to a randomly selected value from one and zero.

13. A digital adaptor and analog adaptor combination for communicating on a PSTN having a backbone network, a line interface for receiving octets from the backbone and for sending baseband signals representative of the received octets on a local loop and for receiving analog signals on the local loop and for sending octets representative of the analog signal on the backbone, wherein the PSTN is affected by robbed bit signaling, and wherein the digital adaptor is couplable to the backbone and the analog adaptor is couplable to the local loop, the digital adaptor comprising first logic for causing an octet sequence to be transmitted on the backbone wherein the sequence includes octets that have their least significant bits vary between a zero and a one; and second logic for causing an octet sequence to be transmitted on the backbone wherein the sequence includes octets having a constant value for their least significant bit; and wherein the analog adaptor comprises third logic, cooperating with the first logic, for analyzing baseband signals received by the analog adaptor from the local loop to determine the distribution of baseband signals caused by octets having an LSB equal to zero and one;

fourth logic, cooperating with the second logic, for analyzing baseband signals received by the analog adaptor from the local loop to determine the distribution of baseband signals caused by octets having an LSB equal to zero and one; and fifth logic, cooperating with the third and the fourth logic, for characterizing an octet window, having octet intervals, in which each interval is characterized as being one of affected by no robbed bit signaling, affected by robbed bit signaling that forces a least significant bit of octets in that interval to a zero, affected by robbed bit signaling that forces a least significant bit of octets in that interval to a one, and affected by robbed bit signaling that forces a least significant bit of octets in that interval to a randomly selected value from one and zero.

14. An analog adaptor for communicating on a PSTN having a backbone network, a line interface for receiving octets from the backbone and for sending baseband signals representative of the received octets on a local loop and for receiving analog signals on the local loop and for sending octets representative of the analog signal on the backbone, wherein the PSTN is affected by robbed bit signaling which alters the least significant bits of octets transmitted on the backbone, and wherein the analog adaptor is couplable to the local loop, the analog adaptor comprising first logic for analyzing baseband signals received by the analog adaptor from the local loop to determine the distribution of baseband signals caused by octets having an LSB equal to zero and one;

second logic for causing the PSTN to send an octet sequence into the backbone in which least significant bits of the octets vary;

third logic for causing the PSTN to send an octet sequence into the backbone in which least significant bits of the octets remain constant;

fourth logic, cooperating with the first, second, and third logic, for analyzing the received baseband signals and characterizing an octet window, having octet intervals, in which each interval is characterized as being one of
affected by no robbed bit signaling,
affected by robbed bit signaling that forces a least significant bit of octets in that interval to a zero,
affected by robbed bit signaling that forces a least significant bit of octets in that interval to a one, and
affected by robbed bit signaling that forces a least significant bit of octets in that interval to a randomly selected value from one and zero.

15. A method of determining whether the public switched telephone network (PSTN) is altering octets transmitted over the PSTN, wherein the PSTN includes a line interface and a digital backbone network, and wherein the line interface receives baseband signals from a local loop and transmits on the backbone network octets representing the amplitude of the baseband signals measured at discrete time intervals, the method comprising the steps of:

causing a time-varying analog test signal to be transmitted on the local loop;

receiving an octet stream from the digital backbone network, which may alter the octets transmitted on it;

logically dividing the octet stream into a number N of octet intervals, where an octet interval consists of every Nth octet from the octet stream; and examining the octets in an octet interval to determine whether the octet interval is affected by a constant form of deterministic distortion introduced by the backbone network.

16. The method of claim 15 wherein the step of examining the octets in an octet interval to determine whether the octet interval is affected by the constant form of deterministic distortion comprises:

determining whether a least significant bit of each of the examined octets is equal to zero.

17. The method of claim 15 wherein the step of examining the octets in an octet interval to determine whether the octet interval is affected by the constant form of deterministic distortion comprises:

determining whether a least significant bit of each of the examined octets is equal to one.

18. The method of claim 15 further comprising the steps of:

causing a substantially non-time-varying analog test signal to be transmitted on the local loop; and examining the octets in the octet interval to determine whether the octet interval is affected by a random form of deterministic distortion.

19. The method of claim 18 wherein the step of examining the octets in the octet interval to determine whether the octet interval is affected by the random form of deterministic distortion comprises:

determining whether a substantial number of the examined octets have a least significant bit equal to zero and a substantial number of the examined octets have a least significant bit equal to one.

* * * * *